(12) United States Patent
Eisler et al.

(10) Patent No.: US 8,312,046 B1
(45) Date of Patent: Nov. 13, 2012

(54) SYSTEM AND METHOD FOR ENABLING A DATA CONTAINER TO APPEAR IN A PLURALITY OF LOCATIONS IN A SUPER-NAMESPACE

(75) Inventors: Michael Eisler, Colorado Springs, CO (US); Daniel S. Nydick, Wexford, PA (US); Peter F. Corbett, Lexington, MA (US); Michael Kazar, Pittsburgh, PA (US); J. Christopher Wagner, Langley, WA (US)

(73) Assignee: NetApp, Inc., Sunnyvale, CA (US)

( * ) Notice: Subject to any disclaimer, the term of this patent is extended or adjusted under 35 U.S.C. 154(b) by 880 days.

(21) Appl. No.: 11/680,255

(22) Filed: Feb. 28, 2007

(51) Int. Cl.
  *G06F 17/30* (2006.01)
(52) U.S. Cl. .................. 707/790; 707/705; 707/609
(58) Field of Classification Search .................. 707/790, 707/705, 609
  See application file for complete search history.

(56) References Cited

U.S. PATENT DOCUMENTS

| | | | |
|---|---|---|---|
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |
| 5,155,835 A | 10/1992 | Belsan | |
| 5,163,131 A | 11/1992 | Row et al. | |
| 5,202,979 A | 4/1993 | Hillis et al. | |
| 5,355,453 A | 10/1994 | Row et al. | |
| 5,485,579 A | 1/1996 | Hitz et al. | |
| 5,581,724 A | 12/1996 | Belsan et al. | |
| 5,701,516 A | 12/1997 | Cheng et al. | |
| 5,802,366 A | 9/1998 | Row et al. | |
| 5,819,292 A | 10/1998 | Hitz et al. | |
| 5,897,661 A | 4/1999 | Baranovsky et al. | |
| 5,931,918 A | 8/1999 | Row et al. | |
| 5,941,972 A | 8/1999 | Hoese et al. | |
| 5,963,962 A | 10/1999 | Hitz et al. | |
| 5,987,477 A | 11/1999 | Schmuck et al. | |
| 6,032,216 A | 2/2000 | Schmuck et al. | |
| 6,038,570 A | 3/2000 | Hitz et al. | |
| 6,065,037 A | 5/2000 | Hitz et al. | |
| 6,173,293 B1 | 1/2001 | Thekkath et al. | |
| 6,275,898 B1 | 8/2001 | DeKoning | |
| 6,324,581 B1 | 11/2001 | Xu et al. | |
| 6,425,035 B2 | 7/2002 | Hoese et al. | |
| 6,434,681 B1 | 8/2002 | Armangau | |
| 6,502,166 B1 | 12/2002 | Cassidy | |
| 6,549,992 B1 | 4/2003 | Armangau et al. | |

(Continued)

FOREIGN PATENT DOCUMENTS

EP  0 892 347  1/1999

(Continued)

OTHER PUBLICATIONS

Article entitled "Data ONTAP GX: A Scalable Storage Cluster" by Eisler et al.*

(Continued)

*Primary Examiner* — Mahesh Dwivedi
(74) *Attorney, Agent, or Firm* — Cesari and McKenna, LLP

(57) ABSTRACT

A system and method to allow a volume to appear in multiple locations in a super-namespace. A super-namespace is a hierarchy of namespaces within a storage system environment, such as a storage system cluster. The volume can appear in multiple locations in the super-namespace and/or in multiple namespaces within the super-namespace.

17 Claims, 13 Drawing Sheets

U.S. PATENT DOCUMENTS

| | | | |
|---|---|---|---|
| 6,564,252 | B1 | 5/2003 | Hickman et al. |
| 6,606,690 | B2 | 8/2003 | Padovano |
| 6,636,879 | B1 | 10/2003 | Doucette et al. |
| 6,643,654 | B1 | 11/2003 | Patel et al. |
| 6,671,773 | B2 | 12/2003 | Kazar et al. |
| 6,697,846 | B1 | 2/2004 | Soltis |
| 6,721,764 | B2 | 4/2004 | Hitz et al. |
| 6,775,672 | B2 * | 8/2004 | Mahalingam et al. .......... 707/10 |
| 6,868,417 | B2 | 3/2005 | Kazar et al. |
| 6,931,450 | B2 | 8/2005 | Howard et al. |
| 6,938,039 | B1 | 8/2005 | Bober et al. |
| 6,978,283 | B1 | 12/2005 | Edwards et al. |
| 7,010,528 | B2 | 3/2006 | Curran et al. |
| 7,038,058 | B2 | 5/2006 | Lee et al. |
| 7,159,093 | B2 | 1/2007 | Dalal et al. |
| 7,162,486 | B2 | 1/2007 | Patel et al. |
| 7,185,144 | B2 | 2/2007 | Corbett et al. |
| 7,194,597 | B2 | 3/2007 | Willis et al. |
| 7,231,412 | B2 | 6/2007 | Hitz et al. |
| 7,240,114 | B2 | 7/2007 | Karamanolis et al. |
| 7,302,520 | B2 | 11/2007 | Kazar et al. |
| 7,366,837 | B2 | 4/2008 | Corbett et al. |
| 7,386,546 | B1 | 6/2008 | Santry et al. |
| 7,409,494 | B2 | 8/2008 | Edwards et al. |
| 7,409,497 | B1 | 8/2008 | Jernigan et al. |
| 7,412,496 | B2 | 8/2008 | Fridella et al. |
| 7,457,822 | B1 | 11/2008 | Barrall et al. |
| 7,502,832 | B2 * | 3/2009 | San Andres et al. .......... 709/216 |
| 7,613,724 | B1 | 11/2009 | Santry et al. |
| 2002/0049883 | A1 | 4/2002 | Schneider et al. |
| 2003/0131104 | A1 * | 7/2003 | Karamanolis et al. ........ 709/225 |
| 2003/0131182 | A1 | 7/2003 | Kumar et al. |
| 2003/0188045 | A1 | 10/2003 | Jacobson |
| 2004/0030668 | A1 | 2/2004 | Pawlowski et al. |
| 2004/0054697 | A1 | 3/2004 | Tsaur et al. |
| 2004/0117438 | A1 | 6/2004 | Considine et al. |
| 2004/0122917 | A1 | 6/2004 | Menon et al. |
| 2004/0133570 | A1 | 7/2004 | Soltis |
| 2004/0133607 | A1 | 7/2004 | Miloushev et al. |
| 2004/0133634 | A1 | 7/2004 | Luke et al. |
| 2004/0139167 | A1 | 7/2004 | Edsall et al. |
| 2005/0097260 | A1 | 5/2005 | McGovern et al. |
| 2006/0074876 | A1 * | 4/2006 | Kakivaya et al. ................. 707/3 |
| 2006/0080370 | A1 * | 4/2006 | Torii et al. ..................... 707/204 |
| 2006/0179261 | A1 | 8/2006 | Rajan |
| 2006/0184587 | A1 | 8/2006 | Federwisch et al. |
| 2006/0184731 | A1 | 8/2006 | Corbett et al. |
| 2007/0043747 | A1 * | 2/2007 | Benton et al. ................. 707/101 |
| 2007/0088702 | A1 * | 4/2007 | Fridella et al. ................. 707/10 |
| 2007/0192551 | A1 * | 8/2007 | Hara et al. ..................... 711/162 |
| 2008/0046538 | A1 * | 2/2008 | Susarla et al. ................. 709/217 |
| 2008/0162607 | A1 | 7/2008 | Torii et al. |
| 2008/0162608 | A1 | 7/2008 | Torii et al. |

FOREIGN PATENT DOCUMENTS

| | | |
|---|---|---|
| JP | 10003440 | 6/1998 |
| WO | WO 00/07101 | 2/2000 |
| WO | WO 2006/118957 | 11/2006 |

OTHER PUBLICATIONS

Article entitled "Introduction to Data ONTAP® GX" by Klivansky, dated May 2006.*
Article entitled "Introduction to Data Ontap GX, Dated Apr. 2006", by Klivansky.*
Article entitled "Spinnaker Networks, Inc" by Spinnaker dated Oct. 23, 2003.*
Article entitled "Data Ontap GX-Netapp's New Horse Team and Wagon for High-Performance Computing" by Fisch dated Jun. 13, 2006.*
Article entitled "Netapp's Future Bering Beta Tested" by Mellor dated Mar. 16, 2006.*
Article entitled "Data Ontap GX Systems" by Netapp, copyright 2006.*
"Data ONTAP 10.0.1R1 Release Notes", published by NetApp, Inc., Sunnyvale, California, last updated Feb. 19, 2009, 48 pages.
Klivansky, Miroslav, "Introduction to Data ONTAP® GX", Technical Report 3468, published by Network Appliance, Apr. 2006, 36 pages.
Klivansky et al. "Introduction to Data ONTAP GX", Technical Report 3468-0002, published by NetApp, May 2008, 38 pages.
"VFM™ (Virtual File Manager) Reference Guide", Version 3.0, Copyright © 2003 Network Appliance, Inc., 195 pages.
"VFM™ (Virtual File Manager) Getting Started Guide", Version 3.0, Copyright © 2003 Network Appliance, Inc., 62 pages.
Corbett et al., "System and Method for Addressing Data Containers Using Data Set Identifiers", U.S. Appl. No. 11/648,161, filed Dec. 29, 2006, 48 pages.
Administration Guide found at http://www.openafs.org/pages/doc/AdminGuide/auagd010.htm, visited on Mar. 2, 2005, 34 pages.
Auspex Systems, LFS—A Local File System for Multiprocessor NFS Network Servers, 1994, 6 pages.
Bitton, et al., Disk Shadowing, 1988, Proceedings of the 14th VLDB Conference, Los Angeles, Calif., 8 pages.
Blasgen, M.W. et al., System R: An architectural Overview, Reprinted from IBM Systems Journal vol. 20, No. 1, 1981, Copyright 1981, 1999, 22 pages.
Borenstein, Nathaniel S., CMU's Andrew project a retrospective, Communications of ACM, 39(12), Dec. 1996, 33 pages.
Brinkmann, A. et al., Efficient Distributed Data Placement Strategies for Storage Area Networks, Proceedings of the Twelfth Annual ACM Symposium on Parallel Algorithms and Architectures, ACM, Jul. 2000, 10 pages.
Brown, Mark R. et al., The Alpine file system, ACM Transactions on Computing Systems, 3(4):261-293, Nov. 1985.
Carns, P. H., et al, "PVFS: A Parallel File System for Linux Clusters", Proceedings of the 4.sup.th Annual Linux Showcase and Conference, Atlanta, GA, Oct. 2000, pp. 317-327.
Celerra File Server Architecture for High Availability, EMC2 where information lives, Aug. 1999, 12 pages.
Chutani, Sailesh, et al., The Episode File System, In Proceedings of the USENIX Winter 1992, 18 pages.
Dibble, Peter C., et al., Beyond Striping: The Bridge Multiprocessor File System, Computer Science Department, University of Rochester, Aug. 11, 1989, 8 pages.
Douglis, Fred, et al., A comparison of two distributed systems: Amoeba and Sprite—Computing Systems, 4(4), Fall 1991, pp. 353-385.
Finlayson, Ross S., et al., Log Files: An Extended File Service Exploiting Write-Once Storage Department of Computer Science, Stanford University, Report No. STAN-CS-87-1177, Sep. 1987, 14 pages.
Gait, Jason, Phoenix: A Safe In-Memory File System. Communications of the ACM, 33(1): pp. 81-86, Jan. 1990.
Ganger, G. R. et al., "Disk Subsystem Load Balancing: Disk Striping vs. Conventional Data Placement", Proceedings of the 26th International Conference System Sciences, Wailea, Hawaii, IEEE, Jan. 5, 1993, 10 pages.
Gray, Jim, et al., The Recovery Manager of the System R Database Manager, ACM Computing Surveys, (13)2:223-242 1981, 20 pages.
Hartman, John H. et al., Performance Measurements of a Multiprocessor Sprite Kernel, Proceedings of the USENIX Conference, 1990, 13 pages.
Hartman, J. H., et al., "Zebra: A Striped Network File System" Proceedings of the Usenix File Systems Workshop, Apr. 1998 pp. 1-9, XP002926950.
Hartman, J. H., et al. "The Zebra Striped Network File System" Dec. 1, 1993, Operating Systems Review, ACM, New York, NY, US, pp. 29-43, XP000418681, Issn: 0163-5908.
Hitz, Dave et al., File System Design for an NFS File Server Appliance, Technical Report 3002, Rev. C395, presented Jan. 19, 1994, 23 pages.
Ho, T. K., et al. "A Row Permutated Data Reorganization Algorithm for Growing Server-Less Video-on-Demand Systems", Third IEEE International Symposium on Cluster Computing and the Grid (CCGrid'03), IEEE/ACM, May 12, 2003, 8 pages.

Honicky, R. J., et al. "A Fast Algorithm for Online Placement and Reorganization of Replicated Data", Proceedings of the International Parallel and Distributed Processing Symposium, (IPDPS), IEEE, Apr. 2003, 10 pages.

Howard, John H., An Overview of the Andrew File System, Carnegie Mellon University, CMU-ITC-88-062 1988, 6 pages.

Howard, John H, et al., Scale and Performance in a Distributed File System, Carnegie Mellon University, CMU-ITC-87-068, Aug. 5, 1987, 33 pages.

Howard, John, H. et al., Scale and performance in a distributed file system, ACM Trans. Computer. System., 6(1), Feb. 1988 pp. 51-81.

Kazar, Michael L., et al., Decorum File System Architectural Overview, USENIX Summer Conference, Anaheim, California, 1990, 13 pages.

Kazar, Michael L., Synchronization and Caching Issues in the Andrew File System, Carnegie Mellon University, CMU-ITC-88-063, 12 pages.

Ligon, W. B. III, et al., "Implementation and Performance of a Parallel File System for High Performance Distributed Application", Proceedings of the fifth IEEE International Symposium on High Performance Distributed Computing, Aug. 1996, 10 pages.

Lorie, Raymond, A, Physical Integrity in a large segmented database, ACM Trans. Database Systems, 2(1):91-104, Mar. 1977.

Lorie, RA, Shadow Page Mechanism, IBM Technical Disclosure Bulletin, Jun. 1986, pp. 340-342.

McKUSICK, Marshall Kirk, et al., A Fast File System for UNIX, Computer Science Division, Department of Electrical Engineering and Computer Sciences, Univ. of CA, Berkley, Feb. 18, 1994, 14 pages.

Microsoft Knowledge Base, How to Create and Manipulate NTFS Junction Points, Article ID 205524, Revision 3.3., Feb. 2007, 3 pages.

Microsoft Knowledge Base, Sparse Point Support in Windows 2000-Based Clusters, Article ID 262797, Revision 2.2, Mar. 2007, 1 page.

Microsoft Knowledge Base, How to Locate and Correct Disk Space Problems on NTFS Volumes, Article ID 262797, Revision 4.5, Mar. 2007, 4 page.

Miller, Ethan L., et al., RAMA: A File System for Massively Parallel Computers, 12.sup.th IEEE Symposium on Mass Storage Systems, Monterey CA, Apr. 1993, pp. 163-168.

Morris, James H., et al., Andrew: A Distributed Personal Computing Environment, Comm. of the ACM, vol. 29, Mar. 1986, pp. 184-201.

Nelson, Michael et al., "Caching in the Sprite Network File System", ACM, Nov. 1987, pp. 3-4.

Network Appliance, Inc., Notification of Transmittal of the International Search Report and the Written Opinion of the International Searching Authority, or the Declaration, International Application No. PCT/US2005/030889, International Filing Date Aug. 31, 2005, Date of Mailing Jan. 13, 2006, 14 pages.

Network Appliance, Inc., Notification of Transmittal of the International Search Report and the Written Opinion of the International Searching Authority, or the Declaration, International Application No. PCT/US2005/031220, International Filing Date Sep. 1, 2005, Date of Mailing Oct. 18, 2006, 12 pages.

Ousterhout, John K. et al., The Sprite Network Operating System, Computer Science Division, Department of Electrical Engineering and Computer Sciences, Univ. of CA, Berkley, Nov. 19, 1987, 32 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988, 18 pages.

Performance Without Compromise: The Virtual Storage Architecture 1997, 11 pages.

Quinlan, Sean, A Cached WORM File System, Software-Practice and Experience, 21(12):1289-1299 (1991).

Rosenberg, J., et al., Stability in a Persistant Store Based on a Large Virtual Memory, in Security and Persistance Rosenber, J. & Keedy, J.L. (ed), Springer-Verlag (1990) pp. 229-245.

Rosenblum, Mendel, et al. The Design and Implementation of a Log-Structured File System Jul. 24, 1991 pp. 1-15.

Rosenblum, Mendel, The Design and Implementation of a Log-Structured File System, 1992, pp. 1-93.

Rosenblum, Mendel, et al., The Design and Implementation of a Log-Structured File System, In Proceedings of ACM Transactions on Computer Systems, (10)1:26-52, Feb. 1992.

Rosenblum, Mendel, et al., The LFS Storage Manager, Computer Science Division, Electrical Engin. and Computer Sciences, Univ. of CA, presented at Summer '90 USENIX Technical Conference, Anaheim, CA Jun. 1990, 16 pages.

Ross, R. B. et al., "Using the Parallel Virtual File System", Jul. 2002, 31 pages.

Sandberg, Russel et al., Design and implementation of the Sun Network Filesystem. In Proc. Summer 1985 USENIX Conf., pp. 119-130, Portland OR (USA), Jun. 1985.

Santry, Douglas S., et al., Deciding When to Forget in the Elephant File System, Operating Systems Review, 34(5), (Dec. 1999) pp. 110-123.

Satyanarayanan, M., et al., The ITC Distributed File System: Principles and Design, In Proceedings of the 10th ACM Symposium on Operating Systems Principles, (19)5:56-67, Dec. 1985.

Satyanarayanan, M., A survey of distributed file-systems. Annual Review of Computing Science, 4(73-104), 1989.

Satyanarayanan, M., et al., Coda: A highly available file system for a distributed workstation environment Carnegie Mellon University, CMU-ITC.

Satyanarayanan, M., et al., Coda: A highly available file system for a distributed workstation environment. IEEE Transactions on Computers, 39(4):447-459, 1990.

Satyanarayanan, M., Scalable, Secure, and Highly Available Distributed File Access, Computer May 1990: 9-21.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shinkai, E., et al.: "HAMFS File System" Reliable distributed systems, 1999. Proceedings of the 18th IEEE Symposium on Lausanne, Switzerland Oct. 19-22, 1999, Los Alamitos, CA, USA, IEEE Comput. Soc., US, Oct. 19, 1999, pp. 190-201, XP010356993.

Sidebotham, Bob, Volumes: The Andrew File System Data Structuring Primitive, EEUG Conference Proceedings, Manchester, UK, Autumn 1986.

Simitci, H., et al.: "Adaptive disk striping for Parallel Input/output" Mass Storage Systems, 1999. 16th IEEE Symposium on San Diego, CA, USA, Mar. 15-18, 1999, Piscataway, NJ, USA, IEEE, US, Mar. 15, 1999, pp. 88-102, XP010376289.

Subramanian, Muralidhar, et al., Performance Challenges in Object-Relational DBMSs, Data Engineering Journal 22, Feb. 1999 pp. 28-32.

Welch, Brent B., et al., Pseudo Devices: User-Level Extensions to the Sprite File System, Computer Science Division, Department of Electrical Engineering and Computer Sciences, Univ. of CA, Berkley, Apr. 1988, 13 pages.

Welch, Brent B., et al., Pseudo-File-Systems, Computer Science Division, Department of Electrical Engineering and Computer Sciences. Univ. of CA, Berkley, Oct. 1989, 22 pages.

West, Michael, et al. The ITC Distributed File System: Prototype and Experience, Carnegie-Mellon University, Technical Report CMU-ITC-040, Mar. 1985, 17 pages.

Kishore et al. System and Method for Integrating Namespace Management and Storage Management in a Storage System Environment, U.S. Appl. No. 11/384,711, filed Mar. 20, 2006, 41 pages.

Kazar et al. Enabling a clustered namespace with redirection, U.S. Appl. No. 11/499,493, filed Aug. 4, 2006, 43 pages.

Santry et al. Metadirectory Namespace and Method for Use of the Same, U.S. Appl. No. 12/564,295, filed Sep. 22, 2009, 40 pages.

* cited by examiner

SYSTEM AND METHOD FOR ENABLING A DATA CONTAINER TO APPEAR IN A PLURALITY OF LOCATIONS IN A SUPER-NAMESPACE

BACKGROUND OF THE INVENTION

1. Field of the Invention

The present invention is directed to storage systems and, in particular, to organizing data containers of a storage system into multiple related name spaces.

2. Background Information

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system generally provides its storage service through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information as a hierarchical structure of data containers, such as files and logical units stored on volumes. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume (hereinafter "volume") may be, although is not necessarily, associated with its own file system.

The storage system may be further configured to operate according to a client/server model of information delivery to thereby allow many clients to access data is containers stored on the system. In this model, the storage system may be embodied as a file server executing an operating system, such as the Microsoft® Windows™ operating system (hereinafter "Windows operating system"). Furthermore, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network. By supporting a plurality of storage (e.g., file-based) access protocols, such as the conventional Common Internet File System (CIFS) and the Network File System (NFS) protocols, the utility of the server is enhanced.

A plurality of storage systems may be interconnected to provide a storage system environment, e.g., a storage system cluster, configured to service many clients. Each storage system may be configured to service one or more volumes of the cluster, wherein each volume comprises a collection of physical storage disks cooperating to define an overall logical arrangement of vbn space on the volume(s). The disks within a volume/file system are typically organized as one or more groups, wherein each group may be operated as a Redundant Array of Independent (or Inexpensive) Disks (RAID).

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname specifies resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the unit of storage, it is desirable to only require a logical pathname to that storage unit. That is, it is desirable to provide the client with a globally unique pathname to the storage (location) without reference to the file server. The conventional Distributed File System (DFS) namespace service is well known to provide such a solution in a Windows environment through the creation of a namespace that removes the specificity of server identity. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource in the network. However, in addition to the DFS namespace provided by is the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource on the server. For example, a storage resource may be connected or "linked" to a link point (link in DFS terminology or a mount point in NFS terminology) to hide the machine specific reference to the resource. By referencing the link point, the client can automatically access information on the storage resource of the specific machine. This allows an administrator to store the information on any server in the network by merely providing a reference to the information.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in VFM™ (Virtual File Manager) Reference Guide, Version 4.0, 2001-2003, and VFM™ (Virtual File Manager) Getting Started Guide, Version 4.0, 2001-2003.

In a storage system cluster environment, a clustered namespace may be implemented with multiple namespaces such that the clustered environment can be shared among multiple clients. When a request is made to access data stored in the cluster, one or more unique identifiers (such as volume identifiers, etc.) of the clustered namespace identify the storage locations originally used to store the data. The unique identifiers are organized within a storage location repository that is replicated throughout the cluster. The unique identifier contained in a data access request often may not correctly identify the storage location of the data, for example, if data has been moved by an administrator. In that case, a redirection identifier is used to indicate that the requested data is not stored in the storage location identified by the unique identifier provided in the data access request. In response to encountering the redirection identifier during the data access request, the storage location repository is examined to find the correct storage location of the data. Thus, instead of explicitly managing a chain of identifiers to multiple storage locations, a system administrator can use redirection identifiers to indicate that the replication storage location repository should be examined. This, in turn, enables the administrator to update the unique identifiers in a central (yet replicated) repository instead of employing the difficult and time-consuming administration task of updating chains of identifiers.

A junction is an exemplary redirection identifier associated with a storage location that indicates that the data is not stored at the originally used location but is available at some other storage location. Junctions can be "mounted" during volume creation by the invocation of a management command from a command line interface (CLI), graphical user interface (GUI), or the like. For example, the command may be "create a volume and mount it on the namespace /a/b/c," wherein the namespace "/a/b/c" comprises pathname components, such as parent directory "a" and sub-directory "b," followed by junction component, "c." Thus, when searching for a "file" in the namespace "/a/b/c/file," the junction at the volume containing the component of the pathname "c" is a hint that the file is located on another volume, potentially on a different storage system of the cluster. The new volume identifier can be recorded in the storage location repository.

Certain constraints have heretofore been applied to namespace architectures to ensure that a volume can be located unambiguously in a namespace hierarchy of, e.g., a storage system cluster. For example, if a parent volume in the cluster were to appear in multiple places in the namespace hierarchy, a client could not perform a lookup operation to ascend from a child volume to the parent volume because it would be ambiguous as to which parent volume namespace it should ascend. In order to allow the client to unambiguously determine the parent volume of any child volume, namespaces in the storage system cluster have heretofore been deliberately limited such that a volume can not appear in more than one storage system namespace. Namespaces have heretofore also been constrained such that a volume can not appear in more than one location in a namespace. These constraints can be disadvantageous in certain applications such as, for example, wherein volumes configured for multiple purposes could be more efficiently accessed if they are allowed to reside in a plurality of namespaces.

SUMMARY OF THE INVENTION

The disadvantages of the prior art are overcome by providing a system and method to allow a volume to appear in multiple locations in a super-namespace. As used herein, a super-namespace is a hierarchy of namespaces within a storage system environment, such as a storage system cluster. In illustrative embodiments, the volume can appear in multiple locations in the super-namespace and/or in multiple namespaces within the super-namespace.

The super-namespace is illustratively organized as a tree structure having a trunk namespace with zero or more branch namespaces associated with the trunk namespace. Illustratively, a volume is allowed to reside in the trunk namespace or in one or more of the branch namespaces associated with the trunk namespace. A volume does not appear in multiple places in the namespace which have an ancestor/descendent relationship. In other words, a volume is not its own ancestor or descendent, but it can be otherwise related to itself within the hierarchy. This restriction obviates "volume cycles", i.e., it prevents a volume from providing a circular reference to itself.

When a request is made to access data stored in a volume, a namespace identifier ("NSID") identifies the trunk or branch namespace of the volume. The NSID that identifies the namespace of the volume is stored in an entry of a junction table of a volume location database (VLDB) when the volume is mounted in the namespace. In the illustrative embodiments, a junction table comprises redirection information to the correct volume storing the data. Each junction table entry also includes a parent volume NSID and a child volume NSID along with a parent volume identifier, a child volume identifier and a junction mode number/generation number.

For an operation to access a volume in a super-namespace by descending in the hierarchy (i.e. from trunk namespace to branch namespace or from parent namespace to child namespace), the operation can refer to the parent volume NSID in the VLDB to find the correct junction entry for the child volume and the child volume's namespace. If the parent namespace is the same as the child namespace, it is implied that the volume being accessed resides in a trunk namespace.

For an operation to access a volume in a super-namespace by ascending in the hierarchy (i.e., from branch namespace to trunk namespace or from child namespace to parent namespace), the operation can refer to its current namespace, current volume and junction along with the parent NSID. The operation can thereby identify a correct parent, for example, wherein a junction may reference more than one higher level volumes.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
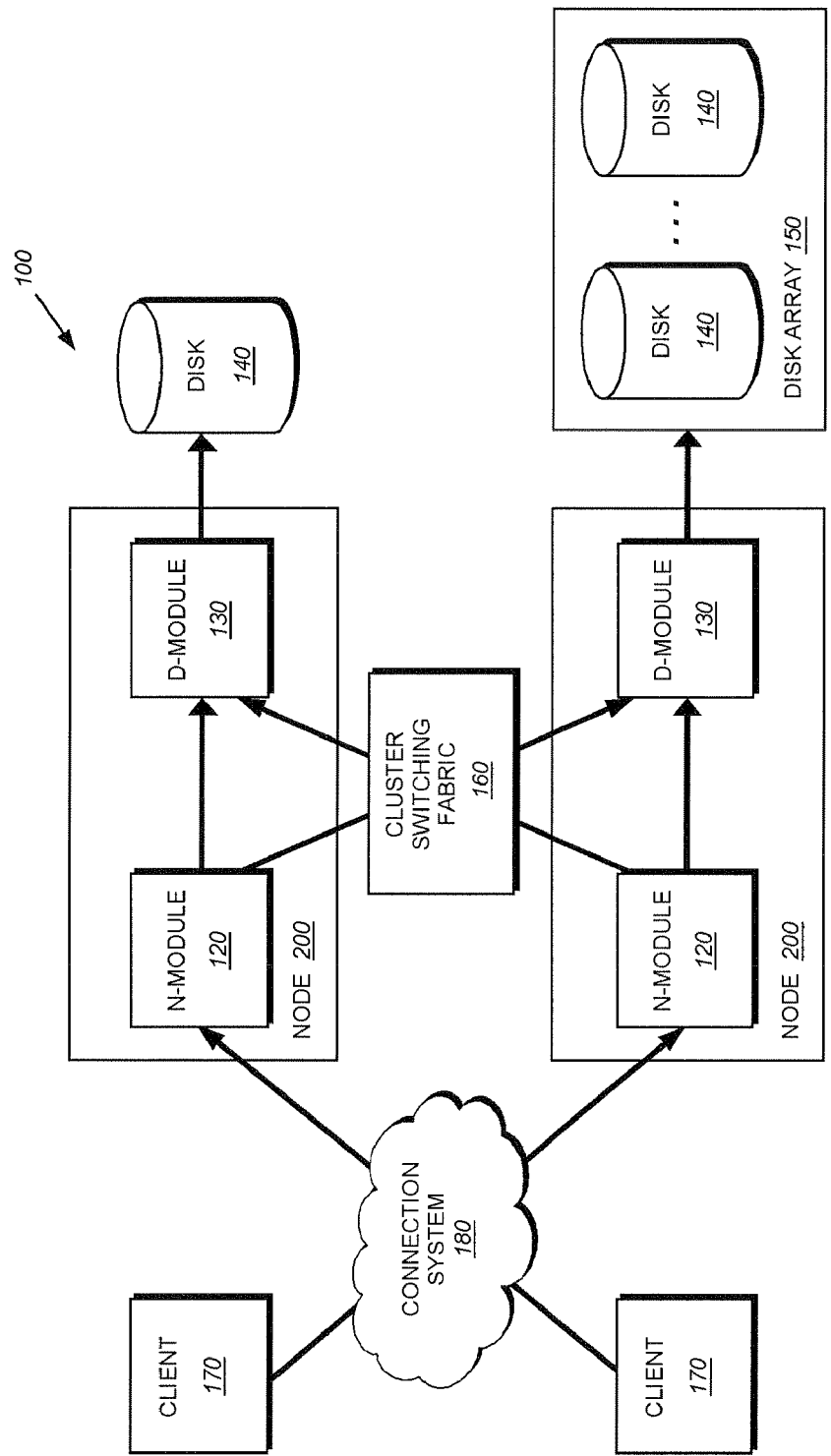
FIG. 1 is a schematic block diagram illustrating a cluster having a plurality of nodes in accordance with an embodiment of the invention.

FIG. 1 is a diagram illustrating a cluster 100 having a plurality of nodes in accordance with an embodiment of the invention. The nodes 200 comprise various functional components that cooperate to provide a distributed storage system architecture. To that end, each node 200 is generally organized as a network element (N-module 120) and a disk element (D-module 130). The N-module 120 includes functionality that enables the node 200 to connect to clients 170 over a connection system 180, while each D-module 130 connects to one or more storage devices, such as disks 140 or a disk array 150. The nodes 200 are interconnected by a cluster switching fabric 160 which, in the illustrative embodiment, may be embodied as a Gigabit Ethernet switch. It should be noted that while there is shown an equal number of N-modules and D-modules in the illustrative cluster 100, there may be differing numbers of N-modules and/or D-modules in accordance with various embodiments of the present invention. For example, there may be a is plurality of N-modules and/or D-modules interconnected in a configuration of a cluster 100 that does not reflect a one-to-one correspondence between the N-modules and D-modules. As such, the description of a node 200 comprising one N-module and one D-module should be taken as illustrative only.

The clients 170 may be general-purpose computers configured to interact with the nodes 200 in accordance with a client/server model of information delivery. For example, interaction between the clients 170 and nodes 200 can enable the provision of storage services. That is, each client 170 may request the services of the node 200, and the node 200 may return the results of the services requested by the client 170, by exchanging packets over the connection system 180 which may be a wire-based or wireless communication system embodied as a computer network. The client 170 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client 170 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Figure 2:
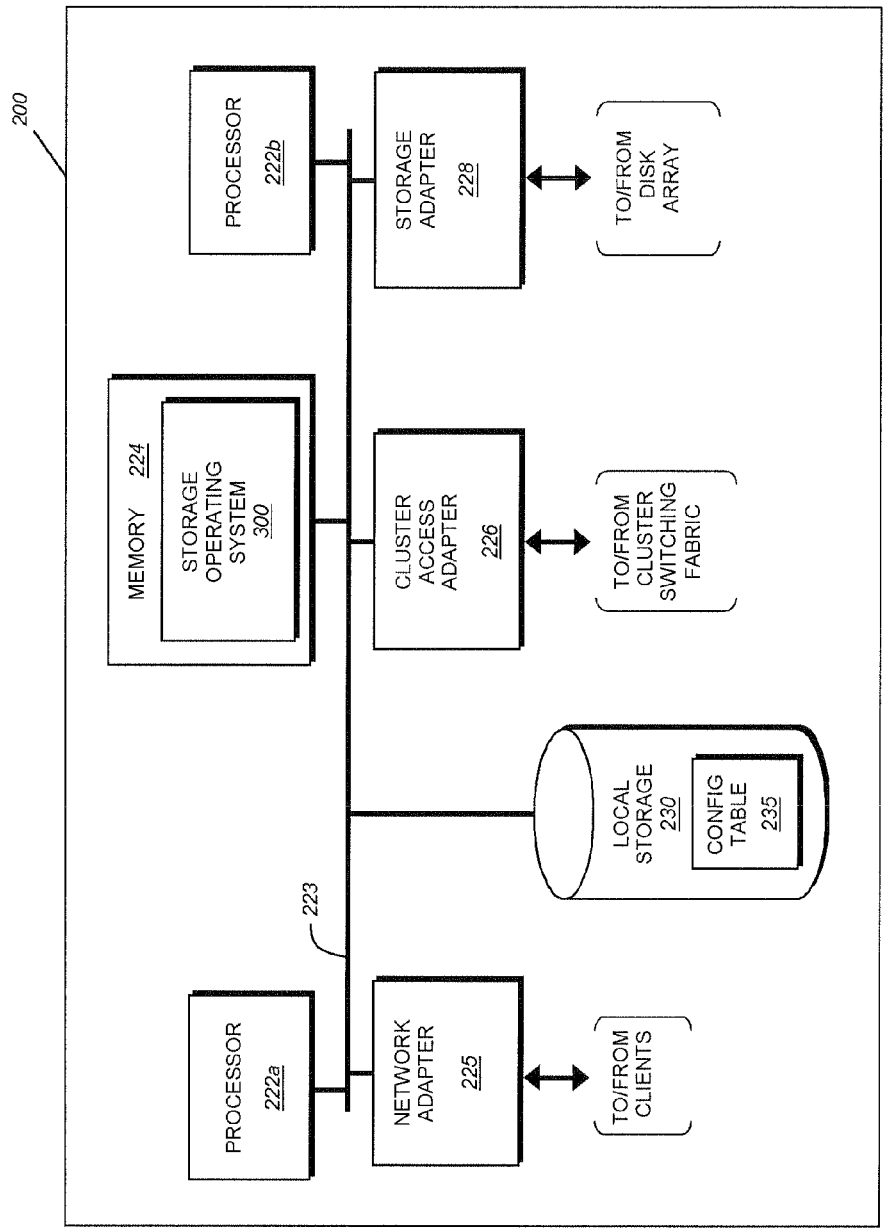
FIG. 2 is a schematic block diagram illustrating a node of the cluster, in accordance with an embodiment of the invention.

FIG. 2 is a diagram illustrating a node 200 of the cluster 100 in accordance with an embodiment of the invention. The node 200 is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more persistent storage devices, such as non-volatile random access memory or disk, utilized by the node 200 to locally store configuration information (e.g., in configuration table 235) provided by one or more management processes. The cluster access adapter 226 comprises a plurality of ports adapted to couple the node 200 to other nodes 200 of the storage system cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of data containers, such as volumes, directories, files and special types of files called virtual disks (hereinafter generally "blocks") on the disks. However, it will be apparent to those of ordinary skill in the art that the node 200 may alternatively comprise a single or more than two processor system. Illustratively, one processor 222a can execute the functions of the N-module 120 on the node, while the other processor 222b can execute the functions of the D-module. It should also be appreciated that processors 222a,b may include multiple processing cores, thus improving the processing speed of the processors 222 a,b.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node 200.

The network adapter 225 comprises a plurality of ports adapted to couple the node 200 to one or more clients 170 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the connection system 180 may be embodied as an Ethernet network or a Fibre Channel (FC) network. Each client 170 may communicate with the node 200 over the connection system 180 by exchanging discrete frames or packets of data according to pre-defined protocols, such as TCP/IP.

The storage adapter 228 cooperates with the storage operating system 300 executing on the node 200 to access information requested by the clients 170. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 140 of the disk array 150. The storage adapter 228 comprises a plurality of ports having input/output (I/O) interface circuitry that couples to the disks over an I/O interconnect arrangement, such as a conventional high-performance, FC link topology.

In accordance with an exemplary embodiment of the present invention, storage of information on each disk array 150 is preferably implemented as one or more volumes that comprise a collection of physical storage disks 140 cooperating to define an overall logical arrangement of volume block number (vbn) space on the volume(s). Each volume is generally, although not necessarily, associated with its own file system. The disks 140 within a volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 140, the storage operating system 300 implements a write-anywhere file system that cooperates with one or more virtualization modules to "virtualize" the storage space provided by the disks 140. A file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system 300 is preferably the NetApp® Data ONTAP® operating system available from Network Appliance Inc., of Sunnyvale, Calif., that implements a Write Anywhere File Layout (WAFL®) file system. However, it is expressly contemplated that any appropriate storage operating system may be enhanced for use in accordance with the inventive principles described herein. As such, the storage operating system 300 should be taken broadly to refer to any storage operating system that is otherwise adaptable to the teachings of this invention.

Figure 3:
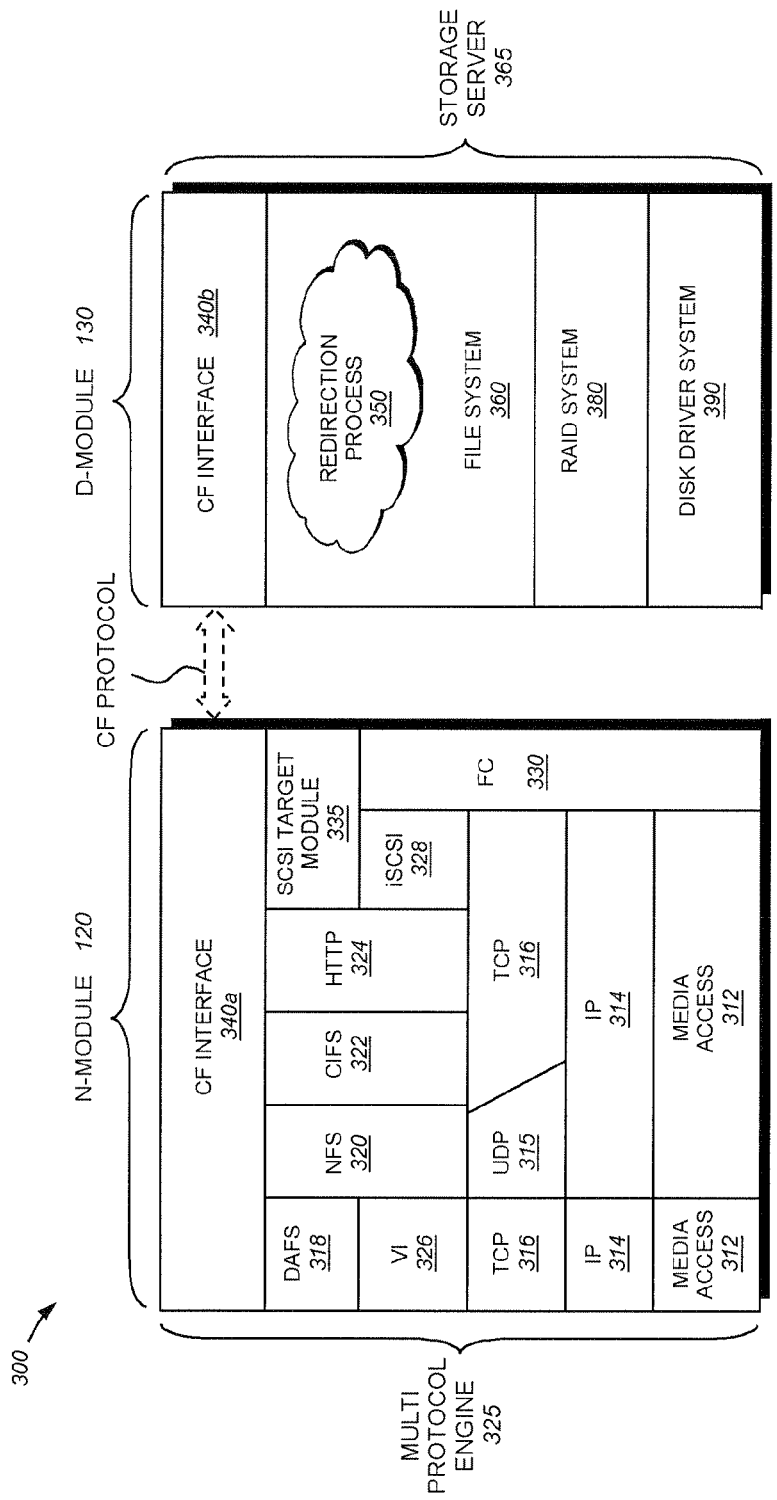
FIG. 3 is a schematic block diagram further illustrating a storage operating system in accordance with an embodiment of the invention.

FIG. 3 is a diagram illustrating the storage operating system 300 in accordance with an embodiment of the invention. The storage operating system 300 comprises a series of software layers organized to form an integrated network protocol stack or, more generally, a multi-protocol engine 325 that provides data paths for clients 170 to access information stored on the node 200 using block and file access protocols. The multi-protocol engine 325 includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to is that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. A iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 that provides data paths for accessing information stored on the disks 140. To that end, the storage server 365 includes a file system module 360, a RAID system module 380 and a disk driver system module 390. As described further herein, the file system 360 includes a redirection process 350 adapted to manage data containers, such as volumes, using redirection identifiers associated with, e.g., the volumes. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework (710 of FIG. 7), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks 140. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store meta-data describing the layout of its file system; these meta-data files include, among others, an mode file. A file handle, i.e., an identifier that includes an mode number, is used to retrieve an mode from disk.

Broadly stated, all modes of the write-anywhere file system are organized into the mode file. A file system (fs) info block specifies the layout of information in the file system and includes an mode of a file that includes all other modes of the file system. Each logical volume has an fsinfo block that is preferably stored at a fixed location within, e.g., a RAID group. The mode of the mode file may directly reference (point to) data blocks of the mode file or may reference indirect blocks of the mode file that, in turn, reference data blocks of the mode file. Within each data block of the mode file are embedded modes, each of which may reference indirect blocks that, in turn, reference data blocks of a file.

Operationally, a request from the client 170 is forwarded as a packet over the connection system 180 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 140 if it is not resident "in core", i.e., in memory 224. If the information is not in memory, the file system 360 indexes into the mode file using the mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 140 and loads the requested data block(s) in memory for processing by the node. Upon completion of the request, the node 200 (and operating system) returns a reply to the client 170 over the connection system 180.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by the client 170. Moreover, in another alternate embodiment of the invention, the processing elements of adapters 225, 228 may be configured to offload some or all of the packet processing and storage access operations, respectively, from processor 222, to thereby increase the performance of the storage service provided by the node 200. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

In an illustrative embodiment, the storage server 365 is embodied as D-module 130 of the storage operating system 300 to service one or more volumes of the disk array 150. Within a cluster having multiple D-modules, multiple volumes may be serviced by a single D-module 130, or multiple volumes may be serviced among multiple D-modules. However, any method of distributing multiple volumes among D-modules or multiple volumes sharing a single D-module are possible, as long as the volumes have associated redirection identifiers that redirect data access requests when the data is relocated among the volumes. The redirection process 350 manages the redirection identifiers or "junctions" by interfacing with management commands issued by an administrator via, e.g., a graphical user interface (GUI), command line interface (CLI), or the like.

In addition, the multi-protocol engine 325 is embodied as N-module 120 to (i) perform protocol termination with respect to a client issuing incoming data access request packets over the connection system 180, as well as (ii) redirect those data access requests to any storage server 365 of the cluster 100. Moreover, the N-module and D-module cooperate to provide a highly-scalable, distributed storage system architecture of a clustered storage system. To that end, each module includes a cluster fabric (CF) interface module 340a,b adapted to implement intra-cluster communication among the modules, including D-module-to-D-module communication for data container (e.g., a file) access operations.

The protocol layers, e.g., the NFS/CIFS layers and the iSCSI/FC layers, of the N-module 120 function as protocol servers that translate file-based and block-based data access requests from clients into CF protocol messages used for communication with the D-module 130. That is, the N-module servers convert the incoming data access requests into file system primitive operations (commands) that are embedded within CF messages by the CF interface module 340 for transmission to the D-modules 130 of the cluster 100. Notably, the CF interface modules 340 cooperate to provide a single file system image across all D-modules in the cluster 100. Thus, any network port of an N-module that receives a client request can access any data container within the single file system image located on any D-module of the cluster 100.

Further to the illustrative embodiment, the N-module and D-module are implemented as separately-scheduled processes of storage operating system 300; however, in an alternate embodiment, the modules may be implemented as pieces of code within a single operating system process. Communication between an N-module and D-module is is thus illustratively effected through the use of message passing between the modules although, in the case of remote communication between an N-module and D-module of different nodes, such message passing occurs over the cluster switching fabric 160. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc.

Figure 4:
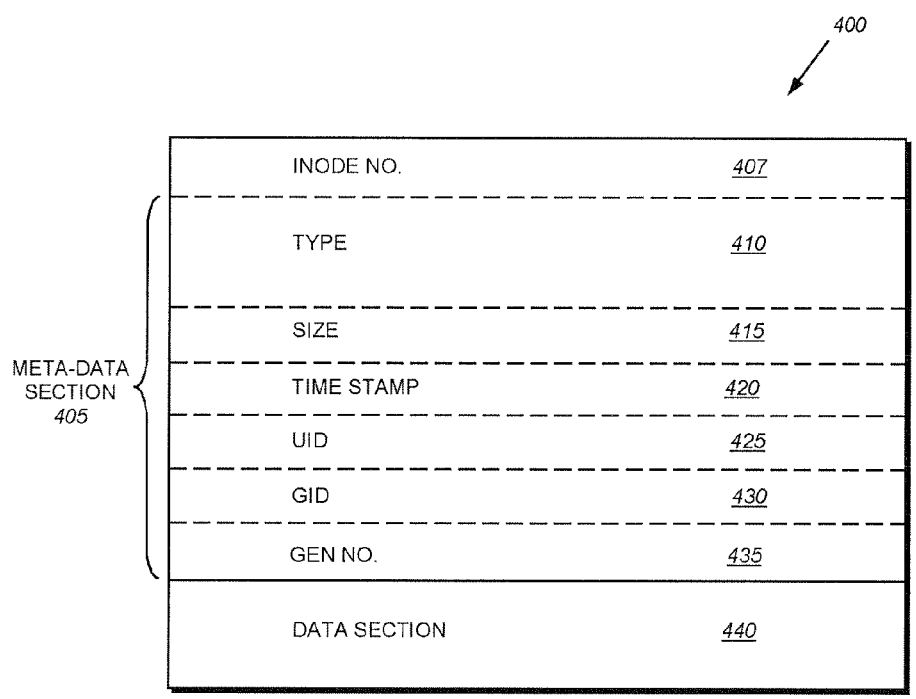
FIG. 4 is a schematic block diagram illustrating an mode that may be advantageously used in accordance with an embodiment of the invention.

In the illustrative embodiment, a data container is represented in the write-anywhere file system as an mode data structure adapted for storage on the disks 140. FIG. 4 is a schematic block diagram of an mode 400, which preferably includes a meta-data section 405 and a data section 440. The information stored in the meta-data section 405 of each mode 400 describes a data container (e.g., a file) and, as such, includes the mode number 407, type (e.g., regular, directory, vdisk, junction) 410 of file, its size 415, time stamps (e.g., access and/or modification time) 420 and ownership, i.e., user identifier (UID 425) and group ID (GID 430), of the file. The meta-data section 405 also includes a generation number 435 which, illustratively, is a monotonically increasing number adapted for use in a variety of embodiments. In one exemplary embodiment, the mode number of a junction-type mode is combined with the generation number to form a multi-bit, e.g., a 32-bit, field that is used to access an entry of a junction table described further herein. However, other exemplary embodiments may use any size for the bit field as long as the field is capable of storing information regarding the junction. Further, the mode 400 includes the data section 440. Specifically, the data section 440 may include file system data or pointers; the latter referencing 4 kB data blocks on a disk used to store the file system data. Each pointer is preferably a logical vbn to facilitate efficiency among the file system and the RAID system 380 when accessing the data on disks.

Figure 5A:
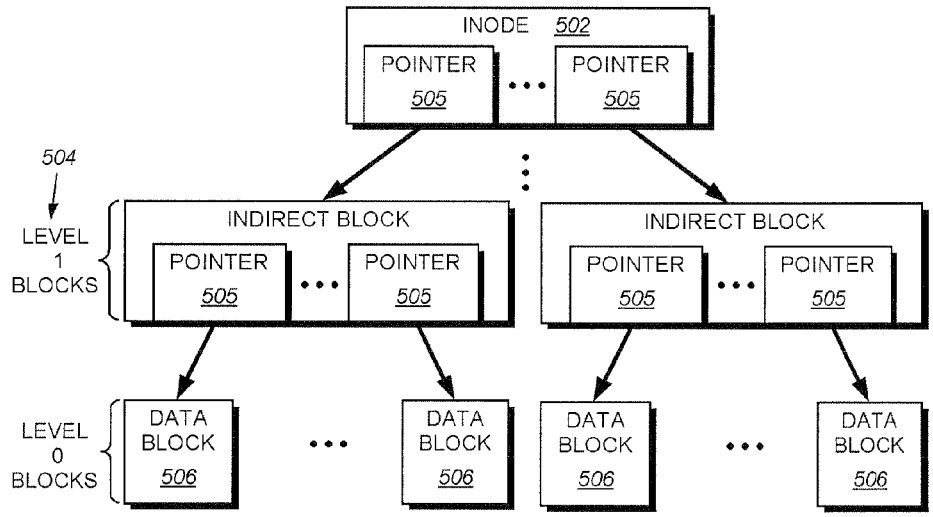
FIGS. 5A and 5B are schematic block diagrams illustrating buffer trees used in the organization of data, in accordance with an embodiment of the invention.

FIG. 5A is a diagram illustrating a buffer tree used in the organization of data, in accordance with an embodiment of the invention. The buffer tree is an internal representation of blocks for a file loaded into the memory 224 and maintained by the write-anywhere file system 360. A root (top-level) mode 502, such as an embedded mode, references indirect (e.g., level 1) blocks 504. Note that there may be additional levels of indirect blocks (e.g., level 2, level 3) depending upon the size of the file. The indirect blocks (and mode) contain pointers 505 that ultimately reference data blocks 506 used to store the actual data of the file. That is, the data of a file are contained in data blocks and the locations of these blocks are stored in the indirect blocks of the file. Each level 1 indirect block 504 may contain pointers to as many as 1024 data blocks. According to the "write anywhere" nature of the file system, these blocks may be located anywhere on the disks 140.

A file system layout is provided that apportions an underlying physical volume into one or more virtual volumes (or flexible volume) of a storage system, such as node 200. In an exemplary embodiment, the underlying physical volume is an aggregate comprising one or more groups of disks, such as RAID groups, of the node 200. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files stored in a flexible volume. This "hybrid" flexible volume embodiment involves the insertion of only the pvbn in the parent indirect block (e.g., Mode or indirect block). On a read path of a logical volume, a "logical" volume (vol) info block has one or more pointers that reference one or more fsinfo blocks, each of which, in turn, points to an Mode file and its corresponding Mode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 5B:
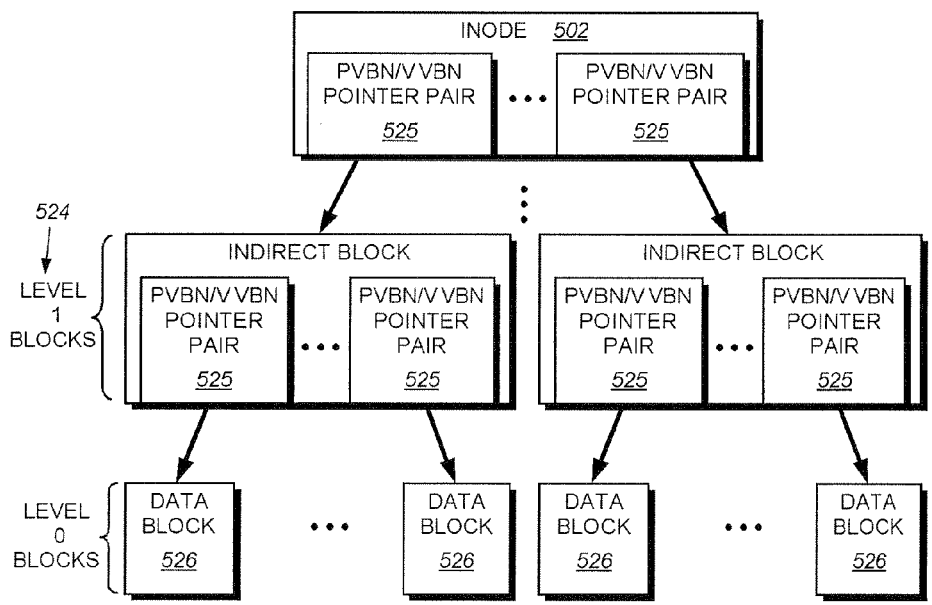

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1(L1) indirect blocks, Mode is file level 0 (L0) blocks. For example, in FIG. 5B, a root (top-level) Mode 520, such as an embedded Mode, references indirect (e.g., level 1) blocks 524. Note that there may be additional levels of indirect blocks (e.g., level 2, level 3) depending upon the size of the file. The indirect blocks (and Mode) contain pvbn/vvbn pointer pair structures 525 that ultimately reference data blocks 526 used to store the actual data of the file.

The pvbns reference locations on disks of the aggregate, whereas the vvbns reference locations within files of the flexible volume. The use of pvbns as block pointers 525 in the indirect blocks 524 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 6:
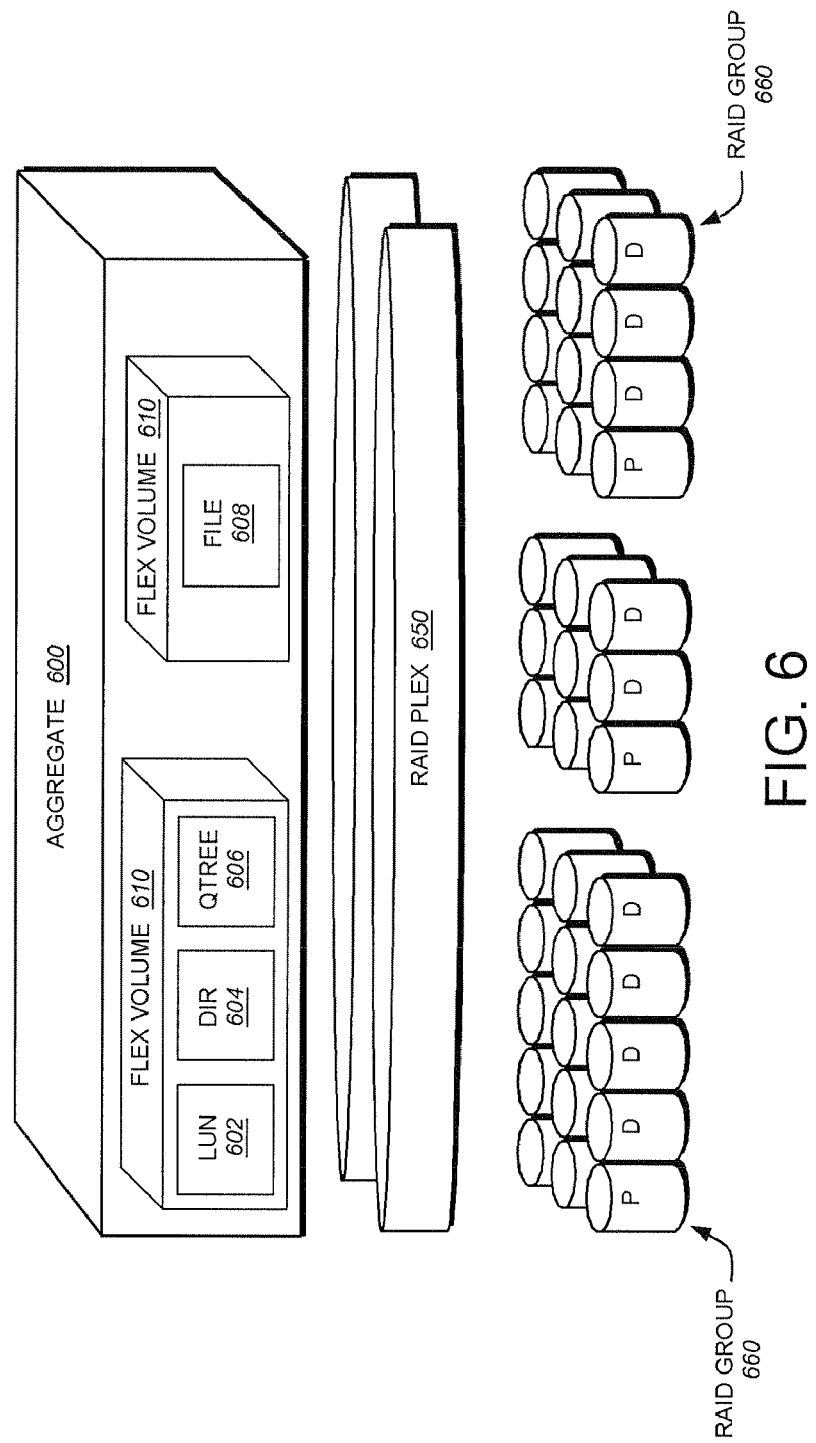
FIG. 6 is a schematic block diagram illustrating an aggregate for organizing data in volumes, in accordance with an embodiment of the invention.

FIG. 6 is a diagram illustrating an aggregate 600 for organizing data in volumes, in accordance with an embodiment of the invention. Specifically, the volume of a node 200 can be a flexible volume 610 or a traditional volume. A traditional volume is a collection of specific disks 140 or RAID groups of the disks 140 that is established by an administrator. A flexible volume is a logical entity that has flexibility in disk 140 or RAID group allocations. Specifically, sizing a flexible volume can occur "on the fly", i.e. real-time, thus avoiding possible disk over-allocations, such as over-allocations for traditional volumes that possibly consume more disk space than is needed at any particular point in time. Thus, flexible volume sizes can range, e.g. in Megabytes (MB) or Gigabytes (GB).

In an exemplary embodiment, luns (blocks) 602, directories 604, qtrees 606 and files 608 may be contained within flexible volumes 610, such as dual vbn flexible volumes, that, in turn, are contained within the aggregate 600. The aggregate 600 is illustratively layered on top of the RAID system, which is represented by at least one RAID plex 650 (depending upon whether the storage configuration is mirrored), wherein each plex 650 comprises at least one RAID group 660. Each RAID group further comprises a plurality of disks, e.g., one or more data (D) disks and at least one (P) parity disk. Whereas the aggregate 600 is analogous to a physical volume of a conventional storage system, a flexible volume is analogous to a file within that physical volume. That is, the aggregate 600 may include one or more files, wherein each file contains a flexible volume 610 and wherein the sum of the storage space consumed by the flexible volumes is physically smaller than (or equal to) the size of the overall physical volume.

Figure 7:
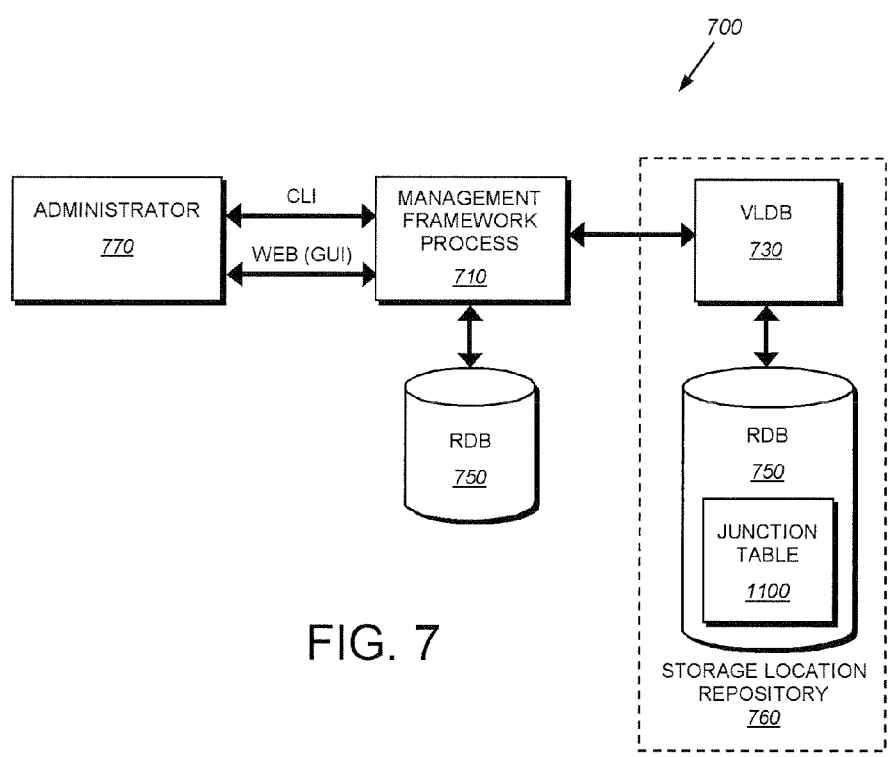
FIG. 7 is a schematic block diagram illustrating a collection of management processes, in accordance with an embodiment of the invention.

FIG. 7 is a diagram illustrating a collection of management processes to manage data stored on one or more storage locations of the cluster. The management processes execute as user mode applications 700 on the storage operation system 300 to provide management of configuration information (i.e. management data) for all the nodes 200. To that end, the management processes include a management framework process 710 and a volume location database (VLDB) process 730, each utilizing a data replication service (RDB 750) linked as a library. The management framework 710 provides an administrator 770 interface via a command line interface (CLI), a web-based graphical user interface (GUI), or the like. The management framework is illustratively based on a conventional common interface model (CIM) object manager that provides the entity to is which administrators interact with a node 200 in order to manage the cluster. The VLDB process 730 is a database process that tracks the storage locations of various storage components (e.g., flexible volumes, aggregates, etc.) within the cluster to thereby facilitate routing of requests throughout the cluster.

The management processes have interfaces to (are closely coupled to) RDB 750. The RDB comprises a library that provides a persistent object store (storing of objects) for the management data processed by the management processes. Notably, the RDB 750 replicates and synchronizes the management data object store access across all nodes 200 of the cluster to thereby ensure that the RDB database image is identical on all of the nodes 200. At system startup, each node 200 records the status/state of its interfaces and IP addresses (those IP addresses it "owns") into the RDB database. Specifically, the VLDB process 730 and the RDB 750 cooperate to provide a storage location repository 760 that includes, e.g., a junction table 1100. It should be appreciated that separation of the VLDB process and the RDB is purely exemplary. Accordingly, in another exemplary embodiment, the storage location repository 760 may be implemented as a VLDB having an integrated database functioning as a persistent object store. Via the administrator interface 770, which may be operated on a node 200 or client 170, management tools may be used to create, modify, and check inconsistencies of the entries of the storage location repository 760. Such exemplary tools are useful for maintaining the replicated database within the cluster, thus avoiding or preventing data inconsistencies within the storage system repository.

In an exemplary embodiment, the N-module 120 of each node 200 accesses configuration table 235 to obtain information that maps volume identifiers to a D-module that "owns" (services) a data container within the cluster. The configuration table 235 illustratively functions as a cache to store frequently accessed VLDB information. The VLDB 730 is capable of tracking the locations of volumes and aggregates of nodes 200. Specifically, the VLDB includes a plurality of entries which, in turn, provides the contents the configuration table 235. Among other things, the VLDB entries keep track of the locations of the flexible volumes (hereinafter generally "volumes") and aggregates 600 within the cluster.

Figure 8:
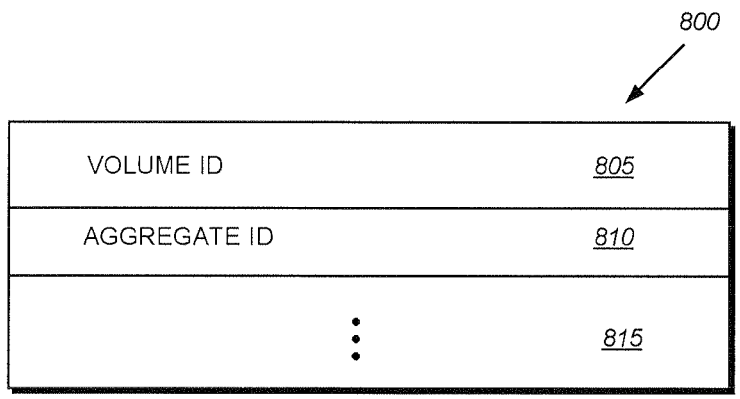
FIG. 8 is a schematic block diagram illustrating a volume location database (VLDB) volume entry, in accordance with an embodiment of the invention.

FIG. 8 is a diagram illustrating an exemplary VLDB volume entry 800, in accordance with an embodiment of the invention. The VLDB entry 800 includes a volume identifier (ID) field 805, an aggregate ID field 810 and, in alternate embodiments, additional fields 815. The volume ID field 805 contains an ID that identifies a volume used in a volume location process. The aggregate ID field 810 identifies the aggregate containing the volume identified by the volume ID field 805.

Figure 9:
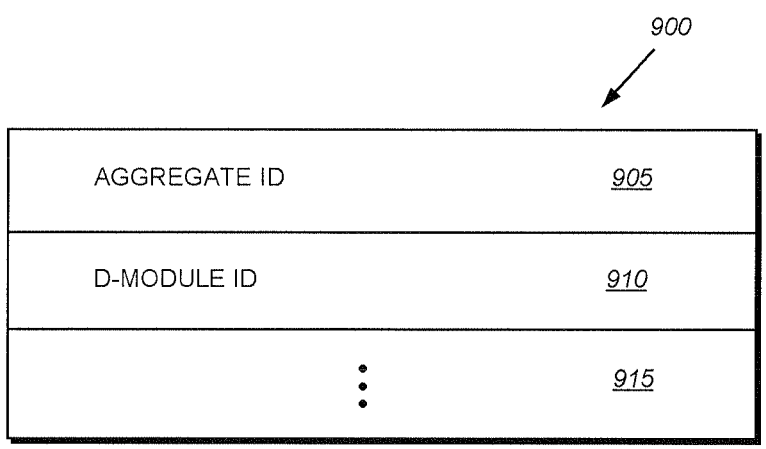
FIG. 9 is a schematic block diagram illustrating a VLDB aggregate entry, in accordance with an embodiment of the invention.

FIG. 9 is a diagram illustrating a VLDB aggregate entry 900, in accordance with an embodiment of the invention. The VLDB aggregate entry 900 includes an aggregate identifier (ID) field 905, a D-Module ID field 910 and, in alternate embodiments, additional fields 915. The aggregate ID field 905 contains an ID of a particular aggregate in the cluster. The D-Module ID field 910 contains an ID of the D-Module hosting the particular aggregate identified by the aggregate ID field 905.

The VLDB 730 illustratively implements a RPC interface, e.g., an ONC RPC interface, which allows an N-Module 120 to query the VLDB 730. When encountering is contents of a data container handle that are not stored in its configuration table 235, the N-Module sends an RPC to a VLDB process. In response, the VLDB 730 process returns to the N-Module the appropriate mapping information, including an ID of the D-Module that owns the data container. The N-Module caches the information in its configuration table 235 and uses the D-Module ID 910 to forward the incoming request to the appropriate D-module servicing the requested data container. All functions and communication between the N-Module and D-Module are coordinated on a cluster-wide basis through the collection of management processes and the RDB library user mode applications.

Figure 10:
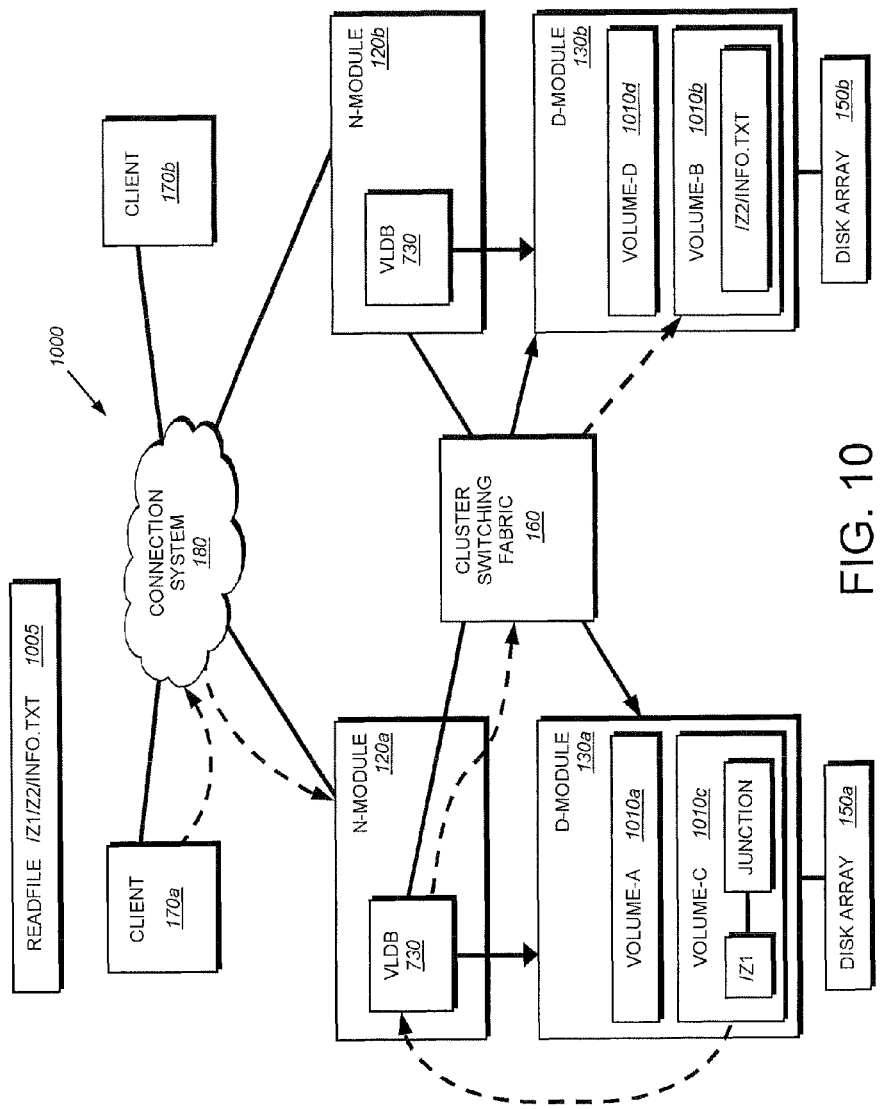
FIG. 10 is a schematic block diagram illustrating redirection of a file system operation in a super-namespace, in accordance with an embodiment of the invention.

FIG. 10 is a diagram illustrating redirection of a file system operation in a cluster. A client 170a issues a data access request to access (e.g. read) a regular file "info.txt" stored at pathname "z1/z2" of the cluster. Illustratively, the data access request embodies an exemplary file system operation 1005 "readfile /z1/z2/info.txt." The client 170a may arbitrarily transmit the data access request via the connection system 180 to an N-module 120a, e.g. because the N-module 120a is geographically closer to the client 170a or that module is not as busy as other N-modules in the cluster. In response to receiving the request, the N-module accesses the VLDB 730 to find the location of the requested file.

Specifically, upon receipt of the data access request, the N-module 120a examines the VLDB 730 to determine the location of a volume that contains the pathname "/z1" using, e.g., the VLDB entries described with respect to FIGS. 8 and 9. Illustratively, the VLDB 730 identifies volume-C 1010c as the volume that contains "/z1" and in turn identifies volume-C's location as D-module 130a. The N-module 120a then forwards the access request to the appropriate D-module (e.g. D-module 130a), and the file system 360 executing on D-module 130a retrieves the modes 400 for "z1" and "z2" from volume-C 1010c. Upon examining the mode for "z2", the file system 360 executing on D-module 130a, encounters a junction As noted, the junction is a type of mode that functions as a redirection identifier associated with a storage location to indicate that the data is not stored at the originally used location, but is available at some other storage location. Junctions are generally created during volume creation and/or administrative reorganization by the invocation of a management command from a CLI, GUI, or the like, issued by the administrator. The command, in turn, may create a junction-type mode, and initiate the storage of volume identification and namespace information relating to the junction in the storage location repository 760.

Figure 11:
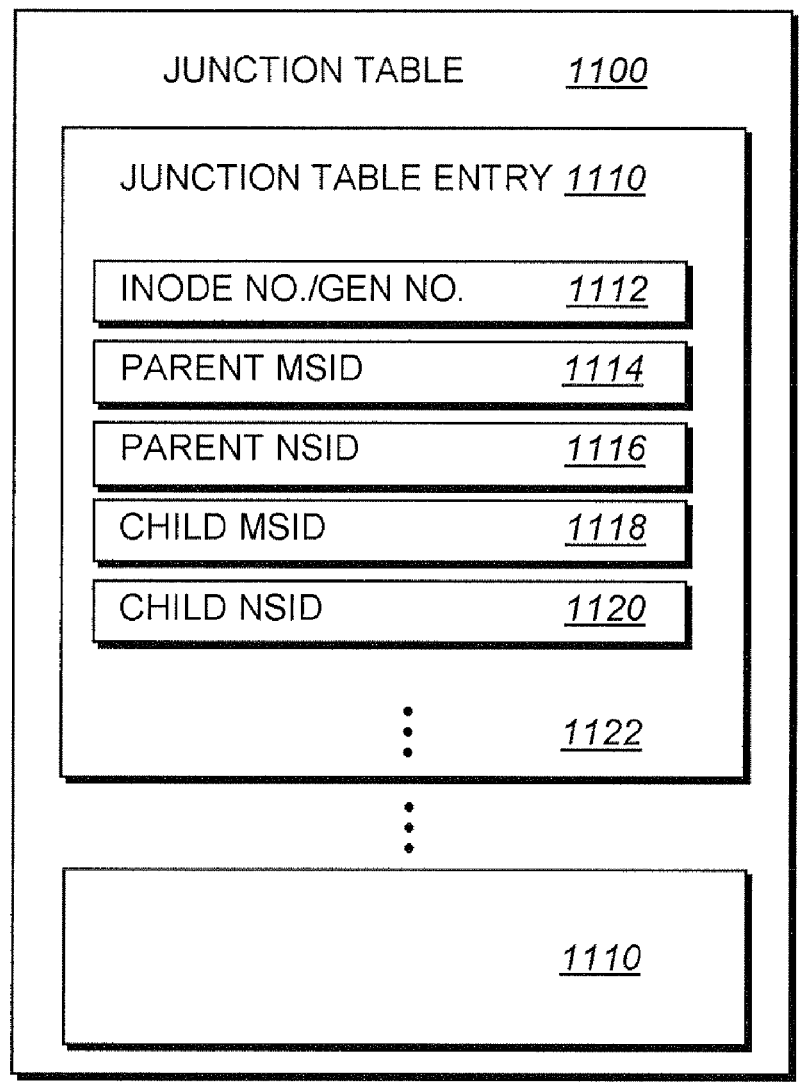
FIG. 11 is a schematic block diagram illustrating a VLDB junction table, in accordance with an embodiment of the invention.

Since the junction is an indication that data is located elsewhere, the file system 360 (i.e., the redirection process 350 of the file system) examines the VLDB 730 to determine the new location of the data. Specifically, the redirection process 350 combines the mode number 407 of the junction-type mode 400 with the generation number 435 from the mode to form an index into the junction table 1100 of the storage location repository 760. FIG. 11 is a schematic block diagram of the junction table 1100 that may be advantageously used with the present invention.

In an exemplary embodiment, the junction table 1100 is a data structure comprising a plurality of entries 1110. Each junction table entry 1110 is identified by an index, e.g., the inode number/generation number 1112 of the corresponding junction-type inode. Each junction table entry includes a parent (e.g., trunk) master set identifier (MSID) 1114, a parent namespace identifier (NSID) 1116, a child (e.g., branch) MSID 1118 and a branch NSID 1120. The MSIDs are volume identifiers that identify a master or active volume and its identically replicated volume in the cluster. An example of MSIDs that may be advantageously used is described in U.S. patent application Ser. No. 11/648,161, which application is hereby incorporated by reference in its entirety. In the illustrative embodiment, the NSIDs 1116, 1120 identify the namespaces of volumes and their associated parent or child volumes, and are stored in junction table entry 1110 when the volumes are mounted in the namespaces.

Upon examining the junction table 1100 of the VLDB 730, the redirection process 350 essentially redirects the access request via the cluster switching fabric 160 to the D-module 130b servicing volume-B 1010b. Again, the file system 360 executing on the D-module 130b retrieves and examines the mode 400 for the requested file. The file "info.txt" is found under the pathname "/z1/z2." By using the junction table, individual volumes need not store volume identification information or maintain complex chains of redirection information.

The storage operating system 300 thereby provides a redirection processes 350 that cooperates with a local configuration table 235 or commonly accessible VLDB 730 to keep track of data as it is written to and moved among disks 140 of a cluster, in RAID groups 660, and within flexible volumes 610 and/or aggregates. However, a client 170 is is generally not concerned with physical location of data within the storage system. Rather, it is desirable for a client to have access to data containers, e.g., files, by reference to the data containers' location in a namespace, such as a super-namespace, using a pathname for example, without requiring the client to have information about the physical location of the data containers' data.

The present invention is directed to a system and method for allowing a volume to appear in multiple locations in a super-namespace. As used herein, a super-namespace is a hierarchy of namespaces within a storage system environment, such as a storage system cluster. In illustrative embodiments, the volume can appear in multiple locations in the super-namespace and/or in multiple namespaces within the super-namespace.

The super-namespace is illustratively organized as a tree structure having a trunk namespace with zero or more branch namespaces associated with the trunk namespace. Illustratively, a volume is allowed to reside in the trunk namespace or in one or more of the branch namespaces associated with the trunk namespace. A volume generally does not appear in the namespace in a parent/child relationship. In other words, a volume generally is not its own parent or child, but it can be otherwise related to itself within the hierarchy. This restriction obviates "volume cycles", i.e., it prevents a volume from providing a circular reference to itself.

A super-namespace is created and accessed by maintaining a database which associates MSIDs with NSIDs. Embodiments of the present invention utilize junction table 1100 in the VLDB 730 of the storage location repository 760 to associate MSIDs of each volume with a corresponding NSID. The VLDB 730 can include additional information is such as parent MSID, child MSID, parent NSID and child NSID to define parent/child relationships among volumes in the super-namespace.

The structure of the super-namespace can be enforced by imposing restrictions during the assignment of parent NSIDs and child NSIDs for particular volumes, i.e. for corresponding MSIDs. Embodiments of the invention allow a volume to be stored in a plurality of branch namespaces. A volume stored in the trunk namespace cannot be stored in branch namespace. Conversely a volume stored in a branch namespaces cannot be stored in a trunk namespace. These restrictions can be enforced by requiring a volume in a trunk namespace to always have its parent and child NSIDs be equal to the NSID of the trunk namespace; and by requiring a volume with its child NSID equal to that of branch namespace always have its parent NSID be equal to the NSID of the trunk namespace or equal to the volume's child-NSID. The use of NSIDs associated with each volume allows a client operation to uniquely identify a parent volume when ascending through the super-namespace to access data beyond a child volume's root directory, for example.

For example, when a request is made to access data stored in a volume that is in a branch namespace, the NSID identifies the branch namespace of the volume. The child NSID 1120 and associated child MSID 1118 identify the branch namespace and the volume associated with the junction-type mode as referenced by the mode number/generation number 1112. The parent MSID 1114 and parent NSID 1116 identify a parent volume associated with the child volume, and a possibly different (i.e. trunk) namespace. If a volume referred to by a junction-type mode resides in a trunk namespace, the corresponding junction table entry includes a parent NSID and child NSID that are equal.

If a junction table entry has parent and child values with the same NSID, it is permissible for this NSID to be that of a branch namespace.

If a junction table entry has parent and child values with different NSIDs, then the parent NSID must be that of a trunk namespace, and the child NSID must be that of a branch namespace.

Associations between certain MSIDs and NSIDs in a junction table entry can be limited in order to restrict the location of volumes within a super-namespace according to certain rules. When a volume's MSID is paired with a corresponding NSID in the child MSID and child NSID fields of a junction table entry, the volume identified by the child MSID is effectively mounted to, i.e., appears in, the namespace identified by the corresponding child NSID.

Embodiments of the present invention provide a super-namespace comprising one trunk namespace at the root of the super-namespace and zero or more branch namespaces associated with the trunk namespace. Volumes can appear in just one place in the trunk namespace. The trunk namespace can be used to build a "top tier" of the super-namespace. Although the illustrative embodiments typically include only a single volume in a trunk namespace, alternative embodiments could have multiple volumes mounted in a trunk namespace within the scope of the present disclosure.

A volume can also only appear in one place within a given branch namespace. However, a volume that appears in a branch namespace can appear in other branch namespaces and can appear in different places within the different branch namespaces.

Although the illustrative embodiments typically include only a single volume in a branch namespace, alternative embodiments could have multiple volumes mounted in a branch namespace within the scope of the present disclosure.

A volume that appears in one or more branch namespaces cannot also reside in a trunk namespace. Thus, volumes can be allowed to appear in multiple places in the super-namespace as long as the places are limited to branch namespaces. This constraint can prevent volume cycles that could otherwise occur, if a volume could be referenced as its own ancestor or descendent.

Figure 12:
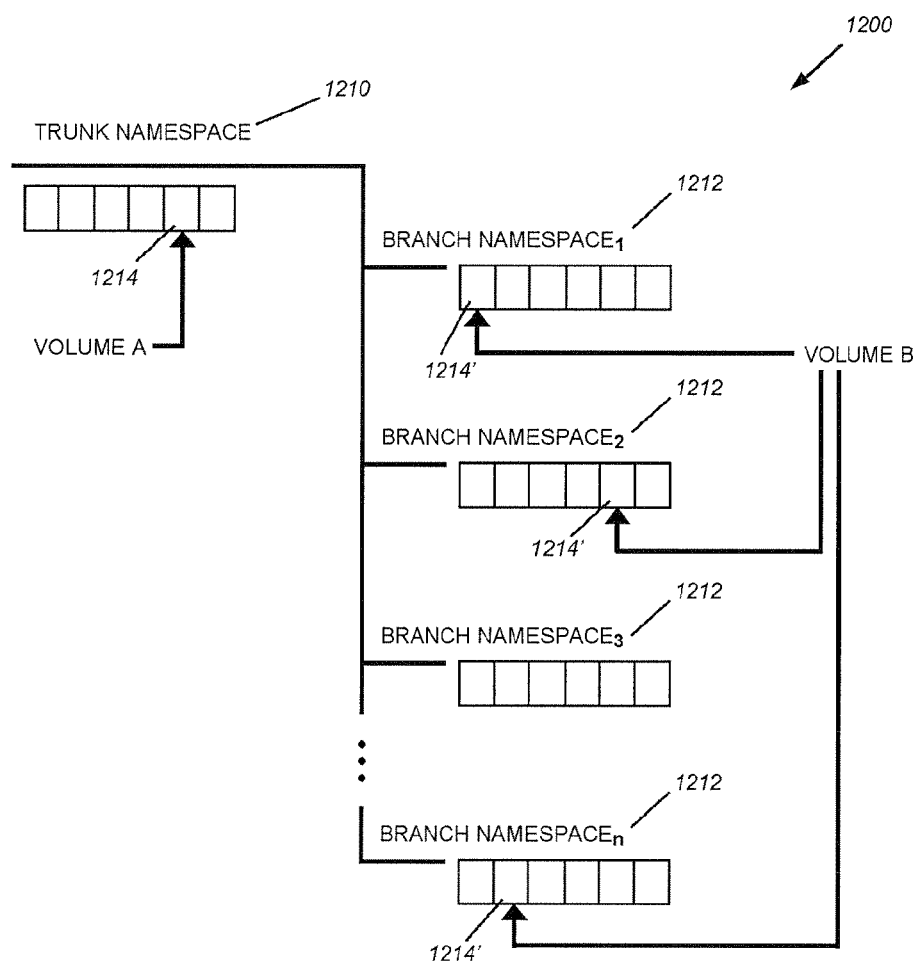
FIG. 12 is a schematic block diagram illustrating a super-namespace having trunk and branch namespaces, in accordance with an embodiment of the invention.

A storage system can unambiguously determine a higher level directory or volume, such as " . . . " relative to the current directory or volume of a file system, when at the root of a current directory or volume in a super-namespace by referring to the parent NSID and parent MSID in the junction table entry that also defines the namespace of the current directory or volume. FIG. 12 is a schematic block diagram illustrating a super-namespace 1200 having a trunk namespace 1210 and a plurality of branch namespaces 1212 associated with the trunk namespace 1210. Each namespace 1210, 1212 comprises a plurality of locations 1214, 1214' as represented by, e.g., pathnames. Any number of branch namespaces 1212 may be associated with a trunk namespace 1210 according to illustrative embodiments of the invention. The super-namespace 1200 can be transparent to a client such that, from the client's perspective, the existence of trunk and branch namespaces is not apparent.

In an illustrative embodiment, a first volume (Volume A) can be mounted in one location 1214 of the trunk namespace 1210. The trunk namespace 1210 has certain properties of a traditional namespace, whereby it can only store one volume and can only store the volume in a single location, e.g., location 1214. Although Volume A is shown in a particular location 1214, it should be apparent that the illustrated location is an arbitrary location of the trunk namespace 1210, and that the first volume could alternatively be mounted in any one of the other locations of the trunk namespace 1210. In alternative embodiments of the invention, additional distinct volumes (not shown) can be also be mounted to other locations of the trunk namespace 1210. Any volume that is mounted to a location of the trunk namespace 1210 can not also be mounted to another location, such as a branch namespace 1212 described below.

Another volume (Volume B) can be mounted in more than one branch namespace 1212 and can be mounted in a different location 1214' within different branch namespaces 1212. Volume B is illustrative of a volume that can be stored in multiple name-spaces (branch namespaces 1212) according to the illustrative embodiments of the invention. Although Volume B is shown in particular locations 1214' of particular branch namespaces 1212, it should be apparent that the illustrated locations are arbitrary locations of the branch namespaces 1212, and that the Volume B could alternatively be mounted in any one location of any branch namespace 1212. However, a volume cannot be mounted to more than one location of a particular branch namespace.

Figure 13:
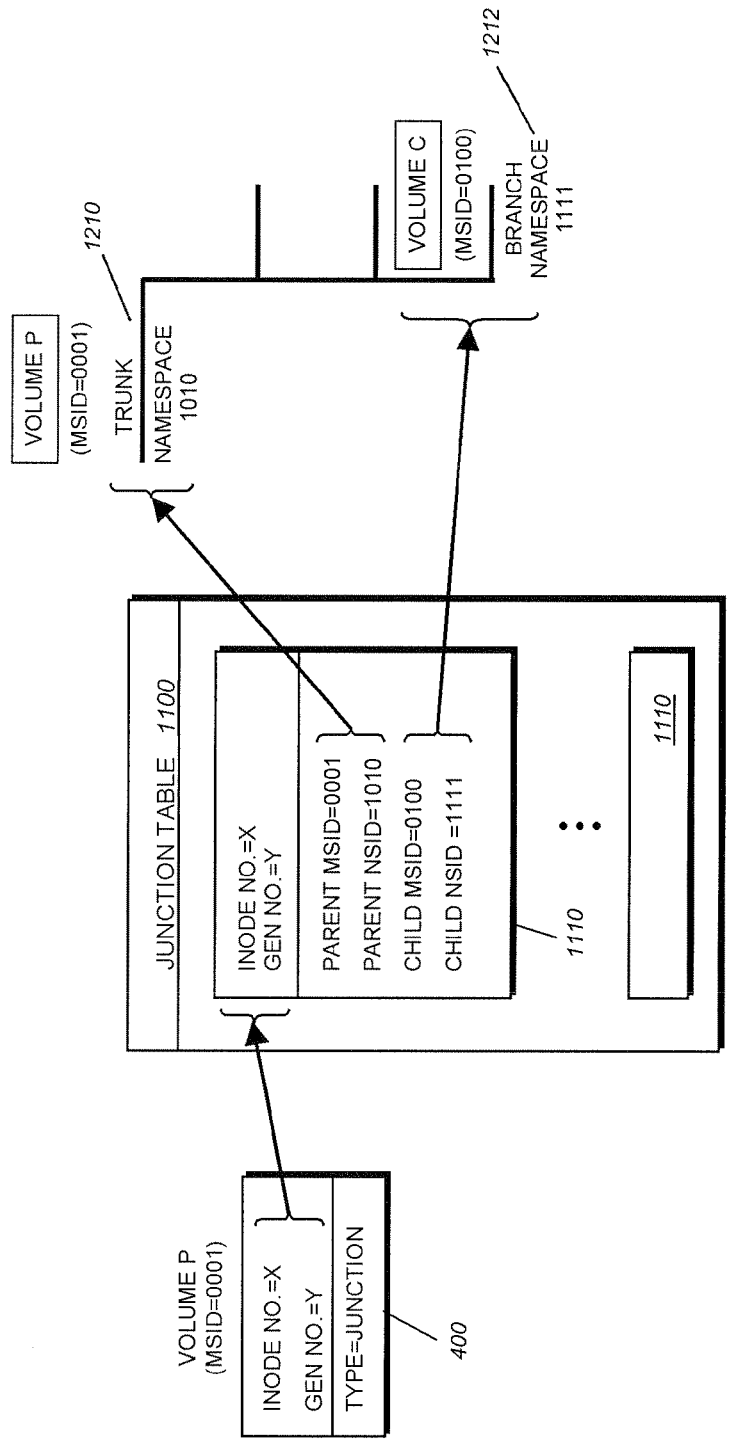
FIG. 13 is a schematic block diagram illustrating relationships between modes, a junction table, and a super-namespace in accordance with an embodiment of the invention.

FIG. 13 is a schematic block diagram illustrating relationships between modes, a junction table, and a super-namespace in accordance with an embodiment of the invention. For each volume that appears in the super-namespace 1200, a junction is created by designating a junction-type mode 400 for the volume. Upon receiving a request (e.g., an instruction) to access a volume, the file system 360 recognizes the junction-type mode 400 as an instruction to access a junction table entry 1110 having an mode number 407 and generation number 435 that corresponds to the junction-type mode 400. As noted, the junction table entry 1110 is one of a plurality of junction table entries 1110 stored in the VLDB 730. A child MSID in the junction table entry 1110 identifies the volume referenced by the mode and a branch NSID in the junction table entry 1110 identifies the branch namespace 1212 or trunk namespace 1210 in which the volume is mounted.

A junction in parent volume P is illustratively referenced by an mode 400 having mode number X and generation number Y. The junction table entry 1110 is indexed by mode number X, generation number Y, volume P's MSID 0001, and a parent NSID 1010 that identifies namespace 1210 (in which volume P is mounted). The junction table entry 1110 includes a child MSID that identifies volume C, and a child NSID that identifies the namespace 1210 in which volume C is mounted. Because volume P is mounted in a trunk namespace 1210, and volume C is mounted in a branch namespace 1212, the parent MSID and parent NSID in the junction table entry 1110 have different values from the child MSID and child NSID.

While FIG. 13 illustrates a child volume in a branch namespace having as its immediate ancestor (parent) a volume in a trunk namespace, there is no requirement that this be always the case. A second junction table entry could have its parent MSID be equal to 0100 (i.e. that of volume C), and its parent NSID be 1111 (i.e. also that of volume C). The second junction table entry would have child NSID also be 1111, and its child MSID be that of volume B as referenced in FIG. 12.

A data access request generally references a correct volume by using a file handle, such as an NFS file handle, included in the request. NFS file handles are well known to persons having ordinary skill in the art. In a traditional namespace, the file handle includes the volume's MSID which is sufficient to identify the correct volume. However, in the super namespace provided by the present invention, because a volume can appear in multiple places, the volume's MSID alone provides insufficient information for locating the volume. Therefore, in an illustrative embodiment, the present invention provides a modified NFS file handle which also includes the volume's NSID.

A client that requires access to data in a super-namespace can ascend from the root of a volume to a parent volume or can descend from a parent volume to a child volume. For example, when an NFS client needs to ascend from the root of a child volume to its parent volume, the junction table is searched to identify junction table entries is wherein the Child NSID field and Child MSID field matches the NSID and MSID provided within the NFS file handle. Once the correct junction table entry is located, the parent MSID and parent NSID found therein is used to identify the parent volume and locate its namespace. When an NFS client needs to descend from a parent volume to a child volume, the junction table is searched to identify junction table entries wherein the Parent NSID field and Parent MSID field matches the NSID and MSID provided within the NFS file handle. Once the correct junction table entry is located, the child MSID and child NSID found therein is used to identify the child volume and its locate its namespace.

Figure 14:
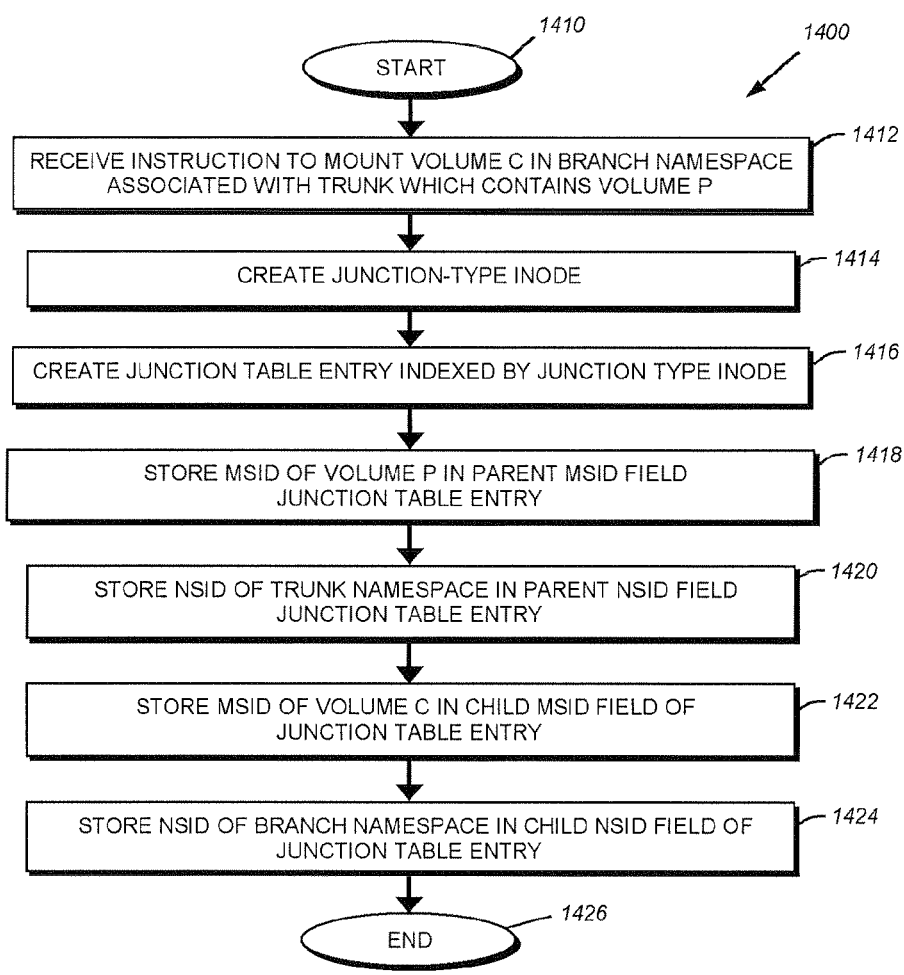
FIG. 14 is a flowchart illustrating the steps of a procedure for constructing a super-namespace and populating a junction table of a VLDB to support the super-namespace.

FIG. 14 is a flowchart illustrating the steps of a procedure, 1400 for constructing a super-namespace and populating a junction table 1100 of a VLDB 730 to support the super-namespace 1200. The procedure 1400 begins in step 1410 and continues to step 1412 wherein a file system 360 receives instructions from a client or administrator to mount a branch namespace (which has its root volume, a volume C) onto volume P (which is mounted in a trunk namespace). In response, the file system (redirection process) creates a first junction-type mode 400 in Volume P in step 1414. In step

1416, a junction table entry 1110 indexed by the junction-type mode is created. In step 1418, the MSID of Volume P is stored in the Parent MSID 1114 field of the junction table entry 1110. In step 1420, the NSID of the trunk namespace is stored in the Parent NSID 1116 field of the junction table entry 1110. In step 1422, the MSID of Volume C is stored in the Child MSID field 1118 of the junction table entry 1110. In step 1424, the NSID of the branch namespace is stored in the Child NSID field 1120. The procedure ends in step 1426.

Additional steps may be taken to enforce rules of the super-namespace when mounting volumes to a namespace within the super-namespace. For example, before allowing a volume to be mounted to a trunk namespace the file system must confirm that the volume is not already mounted to the trunk namespace and that it is not already mounted to a branch of the trunk namespace. This check can be performed, for example, by searching the junction table 1100 for entries 1110 having the proposed MSID in the Child MSID field. If an existing junction table entry 1110 includes the proposed MSID in its Child MSID field, then the procedure to mount the volume into the trunk namespace can be halted and an error message can be issued to indicate that the volume is already mounted to the trunk namespace.

In order to enforce the restriction whereby a volume can be stored only once in a branch namespace, the junction table 1100 can be searched for entries 1110 having the proposed MSID/NSID pair in the Child MSID and Child NSID fields. If an existing junction table entry 1110 includes the proposed MSID/NSID pair in its Child MSID and Child NSID fields, then the procedure can be halted and an error message can be issued to indicate that the volume is already in the proposed branch namespace.

In order to enforce the restriction whereby a volume proposed to be mounted onto a branch namespace cannot also be stored in a trunk namespace, the junction table 1100 can be searched for entries 1110 having the proposed MSID in the Child MSID field. If an existing junction table entry 1110 includes the proposed MSID pair in its Child MSID field, and the junction table entry's Child NSID field is that of trunk namespace, then the is procedure can be halted and an error message can be issued to indicate that the volume is already in a proposed trunk namespace.

According to an illustrative embodiment, the use of a super-namespace permits a volume to appear in multiple places in the same namespace of the same storage system. The extensions to a traditional namespace disclosed herein are achieved while still allowing an instruction (i.e., operation) to unambiguously determine the parent volume of any child volume that appears in multiple places in a namespace or cluster, for example.

The operations herein described are purely exemplary and imply no particular order. Further, the operations can be used in any sequence when appropriate and can be partially used. With the above embodiments in mind, it should be understood that the invention can employ various computer-implemented operations involving data stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives accessible via network attached storage (NAS), Storage Area Networks (SAN), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention

What is claimed is:

1. A method, comprising:
creating a volume on a computer storage device in a namespace environment with a hierarchy of multiple namespaces including a trunk namespace;
generating a plurality of instantiations of the volume in the namespace environment;
maintaining a junction table having a plurality of entries;
associating, in a first entry of the junction table, a first instantiation of the volume with a parent namespace having a parent namespace identifier and a first child namespace having a first child namespace identifier, wherein the namespace environment with the hierarchy of multiple namespaces includes the parent namespace and first child namespace;
associating, in a second entry of the junction table, a second instantiation of the volume with the parent namespace having the parent namespace identifier and a second child namespace having a second child namespace identifier, thereby having the first and second instantiations of the volume appear in multiple namespaces in the namespace environment with the hierarchy of multiple namespaces that include the second child namespace; and
storing, in the junction table having the plurality of entries, restricting values of namespace identifiers such that an instantiation of the volume cannot become its own ancestor within the hierarchy of multiple namespaces, wherein the restricting values require that if the instantiation of the volume is in the trunk namespace, the parent namespace identifier and child namespace identifier for the instantiation of the volume equal a trunk namespace identifier of the trunk namespace.

2. The method of claim 1 comprising:
mounting a child data container in the hierarchy of multiple namespaces, wherein the child data container is related to a parent data container;
generating a junction-type inode for the child data container, the junction-type inode comprising an inode number and a generation number;
generating a particular junction table entry referenced by the inode number, the generation number, a parent data container identifier, and the parent namespace identifier; and
storing, in the particular junction table entry, a particular child namespace to identifier and a child data container identifier corresponding to the child data container.

3. The method of claim 1 comprising:
mounting a parent data container in the hierarchy of multiple namespaces wherein the parent data container is related to a child data container;
generating a junction-type inode for the parent data container, the junction-type inode comprising an inode number and a generation number;
generating a particular junction table entry referenced by the inode number, the generation number, a child data container identifier, and the particular child namespace identifier; and
storing, in the junction table entry, the parent namespace identifier and a parent data container identifier corresponding to the parent data container.

4. The method of claim 1 wherein a master set identifier identifies the volume.

5. The method of claim 1 wherein the junction table is replicated across a cluster of volumes.

6. The method of claim 1, further comprising:
accessing a selected instantiation of the volume in the hierarchy of multiple namespaces by receiving a file handle for a data access operation, wherein the file handle comprises a namespace identifier of the selected instantiation of the volume and a volume identifier of the selected instantiation of the volume; and
searching the junction table for a junction table entry with the namespace identifier and the volume identifier.

7. The method of claim 1 wherein the hierarchy of namespaces is organized as a tree structure with the trunk namespace and one or more branch namespaces associated with the trunk namespace.

8. The method of claim 1 wherein the restricting values require child namespace identifier that is equal to a branch namespace also have the parent namespace identifier that is equal to the trunk namespace identifier of the trunk namespace.

9. A system, comprising:
a volume on a computer storage device configured to be created in a namespace environment with a hierarchy of multiple namespaces including a trunk namespace;
a first entry in a junction table associated with the volume, the first entry including a parent namespace identifier identifying a parent namespace of the namespace environment and a first child namespace identifier identifying a first child namespace of the namespace environment;
a second entry in the junction table associated with the volume, the second entry including the parent namespace identifier identifying the parent namespace and a second child namespace identifier identifying a second child namespace of the namespace environment, thereby having the volume appear in at least two namespaces in the namespace environment with the hierarchy of multiple namespaces; and
a third entry in the junction table storing a restricting value of a namespace identifier whereby the volume cannot become its own ancestor within the hierarchy of multiple namespaces, wherein the restricting values requires that if the first child namespace identifier or the second child namespace identifier is equal to a branch namespace, the parent namespace identifier that identifies the parent namespace is to equal a trunk namespace identifier of the trunk namespace.

10. The system of claim 9 comprising:
a child data container configured to be created in the hierarchy of multiple namespaces, wherein the child data container is configured to relate to a parent data container;
a junction-type inode of the child data container, the junction-type inode comprising an inode number and a generation number;
a particular junction table entry configured to be referenced by the inode number, the generation number, a parent data container identifier corresponding to the parent data container, and the parent namespace identifier; and
the particular junction table entry further configured to reference a particular child namespace identifier and a child data container identifier corresponding to the child data container.

11. The system of claim 9 comprising:
a parent data container configured to be mounted in the hierarchy of multiple namespaces, wherein the parent data container is related to a child data container;
a junction-type inode for the parent data container, the junction-type inode comprising an inode number and a generation number;
a particular junction table entry configured to be referenced by the inode number, the generation number, a child data container identifier corresponding to the child data container, and a particular child namespace identifier; and
the particular junction table entry further configured to reference the parent namespace identifier and a parent data container identifier corresponding to the parent data container.

12. The system of claim 9 wherein a master set identifier identifies the volume.

13. The system of claim 9 wherein the junction table is replicated across a cluster of volumes.

14. The system of claim 9, further comprising:
a file handle configured to be used in accessing a selected volume in the hierarchy of multiple namespaces, wherein the file handle comprises a particular namespace identifier of the selected volume and a volume identifier of the selected volume, and wherein the junction table is further configured to be searched for a junction table entry with the particular namespace identifier and the volume identifier.

15. The system of claim 9 wherein the hierarchy of namespaces is configured to be organized as a tree structure with the trunk namespace and one or more branch namespaces associated with the trunk namespace.

16. The system of claim 9 wherein the restricted values require a selected volume in the trunk namespace to have the parent namespace identifier and child namespace identifier equal to the trunk namespace identifier of the trunk namespace.

17. A non-transitory computer readable storage medium containing executable program instructions executed by a processor, comprising:

program instructions that create a volume on a computer storage device in a namespace environment with a hierarchy of multiple namespaces having a trunk namespace;

program instructions that maintain a plurality of entries in a junction table;

program instructions that associate the volume with a parent namespace, of the namespace environment, having a parent namespace identifier and a first child namespace, of the namespace environment, having a first child namespace identifier in a first entry of the junction table;

program instructions that associate the volume with the parent namespace having the parent namespace identifier and a second child namespace, of the namespace environment, having a second child namespace identifier in a second entry of the junction table, thereby having the volume appear in multiple namespaces in the namespace environment with the hierarchy of multiple namespaces; and program instructions that store, in the junction table having the plurality of entries, restricting values of namespace identifiers such that the volume cannot become its own ancestor within the hierarchy of multiple namespaces, wherein the restricting values require that if the volume is in the trunk namespace, the parent namespace identifier and child namespace identifier for the volume equal a trunk namespace identifier of the trunk namespace.

* * * * *

UNITED STATES PATENT AND TRADEMARK OFFICE
CERTIFICATE OF CORRECTION

PATENT NO. : 8,312,046 B1
APPLICATION NO. : 11/680255
DATED : November 13, 2012
INVENTOR(S) : Michael Eisler et al.

It is certified that error appears in the above-identified patent and that said Letters Patent is hereby corrected as shown below:

In the Specifications:

Col. 1, line 51 should read: "thereby allow many clients to access data ~~is~~ containers stored"

Col. 2, line 47 should read: "namespace provided by ~~is~~ the Windows operating system,"

Col. 4, line 30 should read: "fier and a junction ~~mode~~ inode number/generation number."

Col. 4, line 65 should read: "FIG. 4 is a schematic block diagram illustrating an ~~mode~~ inode"

Col. 5, line 26 should read: "ships between ~~modes~~ inodes, a junction table, and a super-"

Col. 5, line 53 should read: "tion. For example, there may be a ~~is~~ plurality of N-modules"

Col. 8, line 10 should read: "to ~~is~~ that end, includes support for the Direct Access File"

Col. 8, line 63 should read: "byte (kB) blocks and using index nodes ("~~modes~~ inodes") to identify"

Col. 8, line 67 should read: "meta-data files include, among others, an ~~mode~~ inode file. A file"

Col. 9, lines 1-13 should read: "handle, i.e., an identifier that includes an ~~mode~~ inode number, is used to retrieve an ~~mode~~ inode from disk.
    Broadly stated, all ~~modes~~ inodes of the write-anywhere file system are organized into the ~~mode~~ inode file. A file system (fs) info block specifies the layout of information in the file system and includes an ~~mode~~ inode of a file that includes all other ~~modes~~ inodes of the file system. Each logical volume has an fsinfo block that is preferably stored at a fixed location within, e.g., a RAID group. The ~~mode~~ inode of the ~~mode~~ inode file may directly reference (point to) data blocks of the ~~mode~~ inode file or may reference indirect blocks of the ~~mode~~ inode file that, in turn, reference data blocks of the ~~mode~~ inode file. Within each data block of the ~~mode~~ inode file are embedded ~~modes~~ inodes"

Signed and Sealed this
Thirtieth Day of April, 2013

Teresa Stanek Rea
*Acting Director of the United States Patent and Trademark Office*

CERTIFICATE OF CORRECTION (continued)
U.S. Pat. No. 8,312,046 B1

Col. 9, line 26 should read: "the ~~mode~~inode file using the ~~mode~~inode number to access an appropriate"

Col. 11, line 12 should read: "sented in the write-anywhere file system as an ~~mode~~inode data"

Col. 11, line 14 should read: "schematic block diagram of an ~~mode~~inode 400, which preferably"

Col. 11, line 16 should read: "information stored in the meta-section 405 of each ~~mode~~inode"

Col. 11, line 18 should read: "includes the ~~mode~~inode number 407, type (e.g., regular, directory,"

Col. 11, line 25 should read: "plary embodiment, the ~~mode~~inode number of a junction-type ~~mode~~inode"

Col. 11, line 31 should read: "Further, the ~~mode~~inode 400 includes the data section 440. Specifi-"

Col. 11, line 42 should read: "~~mode~~inode 502, such as an embedded ~~mode~~inode, references indirect"

Col. 11, line 45 should read: "the size of the file. The indirect blocks (and ~~mode~~inode) contain"

Col. 12, line 7 should read: "of only the pvbn in the parent indirect block (e.g., ~~Mode~~inode or"

Col. 12, line 11 should read: "to an ~~Mode~~inode file and its corresponding ~~Mode~~inode buffer tree. The"

Col. 12, lines 24-26 should read: "e.g., level 1(L1) indirect blocks, ~~Mode is~~inode file level 0 (L0) blocks. For example, in FIG. 5B, a root (top-level) ~~Mode~~inode 520, such as an embedded ~~Mode~~inode, references indirect (e.g., level 1)"

Col. 12, line 29 should read: "the file. The indirect blocks (and ~~Mode~~inode) contain pvbn/vvbn"

Col. 14, line 15 should read: "to query the VLDB 730. When encountering ~~is~~ contents of a"

Col. 14, lines 49-50 should read: "D-module 130*a* retrieves the ~~modes~~inodes 400 for "z1" and "z2" from volume-C 1010*c*. Upon examining the ~~mode~~inode for "z2","

Col. 14, line 53 should read: "As noted, the junction is a type of ~~mode~~inode that functions as a"

Col. 14, line 61 should read: "type ~~mode~~inode, and initiate the storage of volume identification"

Col. 15, lines 1-3 should read: "process 350 combines the ~~mode~~inode number 407 of the junction-type ~~mode~~inode 400 with the generation number 435 from the ~~mode~~inode to form an index into the junction table 1100 of the"

CERTIFICATE OF CORRECTION (continued)
U.S. Pat. No. 8,312,046 B1

Col. 15, line 18 should read: "patent application Ser. No. 11/648,161, <u>filed on December 29, 2006 by Corbett et al.,</u> which application is"

Col. 15, line 29 should read: "~~mode~~<u>inode</u> 400 for the requested file. The file "info.txt" is found"

Col. 15, line 39 should read: "610 and/or aggregates. However, a client 170 is ~~is~~ generally"

Col. 16, line 4 should read: "VLDB 730 can include additional information ~~is~~ such as"

Col. 16, line 31 should read: "~~mode~~<u>inode</u> as referenced by the ~~mode~~<u>inode</u> number/generation number"

Col. 16, line 35 should read: "to by a junction-type ~~mode~~<u>inode</u> resides in a trunk namespace, the"

Col. 17, line 59 should read: "ships between ~~modes~~<u>inodes,</u> a junction table, and a super-"

Col. 17, line 63 should read: "~~mode~~<u>inode</u> 400 for the volume. Upon receiving a request (e.g., an"

Col. 17, lines 65-66 should read: "nizes the junction-type ~~mode~~<u>inode</u> 400 as an instruction to access a junction table entry 1110 having an ~~mode~~<u>inode</u> number 407 and"

Col. 18, line 1 should read: "~~mode~~<u>inode</u> 400. As noted, the junction table entry 1110 is one of a"

Col. 18, line 4 should read: "the volume referenced by the ~~mode~~<u>inode</u> and a branch NSID in the"

Col. 18, lines 9-10 should read: "by an ~~mode~~<u>inode</u> 400 having ~~mode~~<u>inode</u> number X and generation number Y. The junction table entry 1110 is indexed by ~~mode~~<u>inode</u>"

Col. 18, line 45 should read: "searched to identify junction table entries ~~is~~ wherein the Child"

Col. 18, line 67 should read: "junction-type ~~mode~~<u>inode</u> 400 in Volume P in step 1414. In step"

Col. 19, line 2 should read: "type ~~mode~~<u>inode</u> is created. In step 1418, the MSID of Volume P is"

Col. 19, line 40 should read: "namespace, then the ~~is~~ procedure can be halted and an error"

In the Claims:

Col. 21, line 18 should read: "child namespace ~~to~~ identifier and a child data container"

Col. 21, line 29 should read: "container identifier, and ~~the~~<u>a</u> particular child namespace"

Col. 21, line 52 should read: "require<u> a</u> child namespace identifier that is equal to a branch"

Col. 22, line 15 should read: "namespace is ~~to~~ equal<u> to</u> a trunk namespace identifier of the"